& #124;

(12) United States Patent
Jung et al.

(10) Patent No.: US 7,849,407 B2
(45) Date of Patent: Dec. 7, 2010

(54) CONTENT DISTRIBUTION SERVICE

(75) Inventors: Edward K. Y. Jung, Bellevue, WA (US);
Royce A. Levien, Lexington, MA (US);
Robert W. Lord, Seattle, WA (US);
Jacque Deerr-Lord, legal representative, Seattle, WA (US); Mark A. Malamud, Seattle, WA (US); John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 907 days.

(21) Appl. No.: 11/440,713

(22) Filed: May 24, 2006

(65) Prior Publication Data

US 2007/0276902 A1  Nov. 29, 2007

(51) Int. Cl.
*G06F 15/00* (2006.01)
*G06F 13/00* (2006.01)

(52) U.S. Cl. .................................. 715/734; 715/737

(58) Field of Classification Search ......... 715/763–765, 715/851–853, 738–744, 734–737; 725/5, 725/25; 709/209, 223
See application file for complete search history.

(56) References Cited

U.S. PATENT DOCUMENTS

| 7,113,999 | B2 | 9/2006 | Pestoni et al. |
| 2002/0067909 | A1 | 6/2002 | Iivonen |
| 2003/0204723 | A1 | 10/2003 | Narin et al. |
| 2004/0249768 | A1 | 12/2004 | Kontio et al. |
| 2005/0004875 | A1 | 1/2005 | Kontio et al. |
| 2005/0226170 | A1 | 10/2005 | Relan et al. |
| 2005/0251690 | A1 | 11/2005 | Kuno et al. |
| 2005/0273399 | A1 | 12/2005 | Soma et al. |
| 2006/0008256 | A1 | 1/2006 | Khedouri et al. |
| 2006/0010453 | A1 | 1/2006 | Illowsky et al. |
| 2006/0020960 | A1 | 1/2006 | Relan et al. |
| 2006/0087987 | A1* | 4/2006 | Witt et al. .................. 370/260 |
| 2006/0101022 | A1 | 5/2006 | Yu et al. |
| 2006/0112143 | A1 | 5/2006 | Subramanian |
| 2006/0129458 | A1 | 6/2006 | Maggio |
| 2006/0161621 | A1* | 7/2006 | Rosenberg .................. 709/204 |
| 2006/0168012 | A1 | 7/2006 | Rose et al. |
| 2006/0205517 | A1 | 9/2006 | Malabuyo et al. |
| 2006/0206486 | A1 | 9/2006 | Strickland |
| 2007/0038999 | A1 | 2/2007 | Millington |

(Continued)

OTHER PUBLICATIONS

Kirk, Jeremy; "South Korea to Launch Massive Test of Mobile Entertainment"; IDG News Service; bearing a date of Mar. 8, 2005; pp. 1-4; PCWorld.com; located at: http://www.pcworld.com/news/article/0,aid,119932,00.asp; printed on May 23, 2006.

(Continued)

*Primary Examiner*—Cao "Kevin" Nguyen
(74) *Attorney, Agent, or Firm*—Lee & Hayes, PLLC

(57) ABSTRACT

This disclosure describes content distribution circuitry that supports content distribution between one or more users. The disclosure describes a system including circuitry for receiving a request for at least a specific instance of content from a user; circuitry for receiving a request to notify at least one remote user that said specific instance of said content has been selected by said user; and circuitry for transmitting said specific instance of said content to said user and said at least one remote user.

13 Claims, 29 Drawing Sheets

U.S. PATENT DOCUMENTS

| | | |
|---|---|---|
| 2007/0094091 A1 | 4/2007 | Chabourov et al. |
| 2007/0112676 A1 | 5/2007 | Kontio et al. |
| 2007/0192252 A1 | 8/2007 | Shear et al. |
| 2008/0212945 A1 | 9/2008 | Khedouri et al. |
| 2009/0282102 A1 | 11/2009 | Geurts et al. |

OTHER PUBLICATIONS

Lemon, Sumner; "Samsung unveils portable media player with satellite TV"; IDG News Service; bearing a date of Sep. 27, 2005 and 2006; pp. 1-3; InfoWorld.com; located at: http://www.infoworld.com/article/05/09/27/HNsamsungsatellitetv_1.html?HANDHELDS; printed on May 23, 2006.

"Media Distribution System: Product Overview"; MediaFLO™: Revolutionizing Multimedia; bearing dates of Feb. 21, 2005 and 2005; pp. 1-14; Qualcomm Incorporated; San Diego, CA; located at: http://www.qualcomm.com/mediaflo/news/pdf/mds_whitepaper.pdf.

"Mobile TV Broadcasting: Now's the Time to Create the Future"; Nokia Connecting People; bearing a date of Feb. 2005; pp. 1-16; Nokia; located at: http://www.mobiletv.nokia.com/resources/files/mobile_tv_brochure_2005.pdf.

"Play Free and Fun Online Games: AOL® Instant Messenger™"; Games.aol.com; bearing a date of 2006; pp. 1-6; AOL LLC; located at: http://games.aol.com/aimgames; printed on May 23, 2006.

"SwitchTower Multimedia Network"; Internet Web Conferencing Technology and Multimedia Network; p. 1; Raindance.com; located at: http://www.raindance.com/rndc/technology/aboutSwitchTower.jsp; printed on May 23, 2006.

Tae-Gyu, Kim; "Satellite DMB turns one, struggles to stay afloat"; Korea Times; bearing a date of May 8, 2006 and 2006; pp. 1-2; AsiaMedia: Media News Daily and The Regents of the University of California; located at: http://www.asiamedia.ucla.edu/article.asp?parentid=44951; printed on May 23, 2006.

U.S. Appl. No. 11/515,494, Jung et al.

U.S. Appl. No. 11/507,953, Jung et al.

* cited by examiner

CONTENT DISTRIBUTION SERVICE

SUMMARY

An embodiment provides a method. In one implementation, a method includes but is not limited to receiving a request for at least a specific instance of content from a user, receiving a request to notify at least one remote user that said specific instance of said content has been selected by said user, transmitting a notification to said at least one remote user that said user has selected said specific instance of said content, receiving an indication that said at least one remote user selected said specific instance of said content, transmitting said indication that said at least one remote user selected said specific instance of said content to said user, transmitting said specific instance of said content to said user and said at least one remote user, and enabling interaction between said user and said at least one remote user. In addition to the foregoing, other method aspects are described in the claims, drawings, and text forming a part of the present disclosure.

An embodiment provides a method. In one implementation, a method includes but is not limited to receiving at a user device, a notification that at least one remote user has selected a specific instance of content, displaying on said user device a request to select said specific instance of content indicated by said notification, receiving a request to select said specific instance of said content, transmitting an indication to said at least one remote user that said specific instance of said content has been selected, receiving said specific instance of said content, displaying on said user device said specific instance of said content, enabling said user device to handle at least one manipulation of at least said specific instance of said content, and enabling said user device to communicate with at least one remote user. In addition to the foregoing, other method aspects are described in the claims, drawings, and text forming a part of the present disclosure.

An embodiment provides a method. In one implementation, a method includes but is not limited to transmitting a request for content to a server, receiving on a user device, information identifying one or more specific instances of said content from said server, displaying on said user device an indication of said one or more specific instances of said content, receiving a request for at least a specific instance of said content, server, receiving, transmitting said notification to at least one remote user to said server, receiving from said server an indication that at least one remote user has selected said specific instance of said content, receiving on said user device said specific instance of said content, and enabling said user device to send and receive at least one communication from at least one remote user. In addition to the foregoing, other method aspects are described in the claims, drawings, and text forming a part of the present disclosure.

An embodiment provides a method. In one implementation, the method includes but is not limited to receiving, at a user device a notification indicating at least a specific instance of content, transmitting a request to receive at least said specific instance of content to a server, and receiving at least said specific instance of content from said server. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer. In addition to the foregoing, other system aspects are described in the claims, drawings, and text forming a part of the present application.

An embodiment provides a method. In one implementation, the method includes but is not limited to transmitting a notification to at least one remote user that a user has selected a specific instance of said content. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer. In addition to the foregoing, other system aspects are described in the claims, drawings, and text forming a part of the present application.

An embodiment provides a method. In one implementation, the method includes but is not limited to receiving at a user device a notification that at least one remote user has selected a specific instance of content, displaying on said user device a request to select said specific instance of content indicated by said notification, and transmitting an indication to said at least one remote user that said specific instance of said content has been selected. In addition to the foregoing, other method aspects are described in the claims, drawings, and text forming a part of the present disclosure.

An embodiment provides a system. In one implementation, the system includes but is not limited to circuitry for receiving a request for at least a specific instance of content from a user, circuitry for receiving a request to notify at least one remote user that said specific instance of said content has been selected by said user, circuitry for transmitting a notification to said at least one remote user that said user has selected said specific instance of said content, circuitry for receiving an indication that said at least one remote user selected said specific instance of said content, circuitry for transmitting said indication that said at least one remote user selected said specific instance of said content to said user, circuitry for transmitting said specific instance of said content to said user and said at least one remote user, and circuitry for enabling interaction between said user and said at least one remote user. In addition to the foregoing, other system aspects are described in the claims, drawings, and text forming a part of the present disclosure.

An embodiment provides a device. In one implementation, the device includes but is not limited to circuitry for receiving at a user device, a notification that at least one remote user has selected a specific instance of content, circuitry for displaying on said user device a request to select said specific instance of content indicated by said notification, circuitry for receiving a request to select said specific instance of said content, circuitry for transmitting an indication to said at least one remote user that said specific instance of said content has been selected, circuitry for receiving said specific instance of said content, circuitry for displaying on said user device said specific instance of said content, circuitry for enabling said user device to handle at least one manipulation of at least said specific instance of said content, and circuitry for enabling said user device to communicate with at least one remote user. In addition to the foregoing, other device aspects are described in the claims, drawings, and text forming a part of the present disclosure.

An embodiment provides a device. In one implementation, the device includes but is not limited to circuitry for transmitting a request for content to a server, circuitry for receiving on a user device, information identifying one or more specific instances of said content from said server, circuitry for displaying on said user device an indication of said one or more specific instances of said content, circuitry for receiving a request for at least a specific instance of said content, circuitry for transmitting said request for at least said specific instance of said content to said server, circuitry for receiving a request to send a notification to at least one remote user, circuitry for transmitting said notification to at least one remote user to said server, circuitry for receiving from said server, an indication that at least one remote user has selected said specific instance of said content, circuitry for receiving on said user device said specific instance of said content, circuitry for enabling said user device to send and receive at least one communication from at least one remote user. In addition to the foregoing, other device aspects are described in the claims, drawings, and text forming a part of the present disclosure.

An embodiment provides a method. In one implementation, a method includes but is not limited to receiving at a user device a notification that at least one remote user has selected a specific instance of content; displaying on said user device a request to select said specific instance of content indicated by said notification; and transmitting an indication to said at least one remote user that said specific instance of said content has been selected. In addition to the foregoing, various other method aspects are set forth and described in the text (e.g., claims and/or detailed description) and/or drawings of the present application.

In addition to the foregoing, various other aspects are set forth and described in the text (e.g., claims and/or detailed description) and/or drawings of the present description.

The foregoing is a summary and thus contains, by necessity, simplifications, generalizations and omissions of detail; consequently, those skilled in the art will appreciate that the summary is illustrative only and is not intended to be in any way limiting. Other aspects, features, and advantages of the devices and/or processes described herein will become apparent in the detailed description set forth herein.

DETAILED DESCRIPTION

Figure 1:
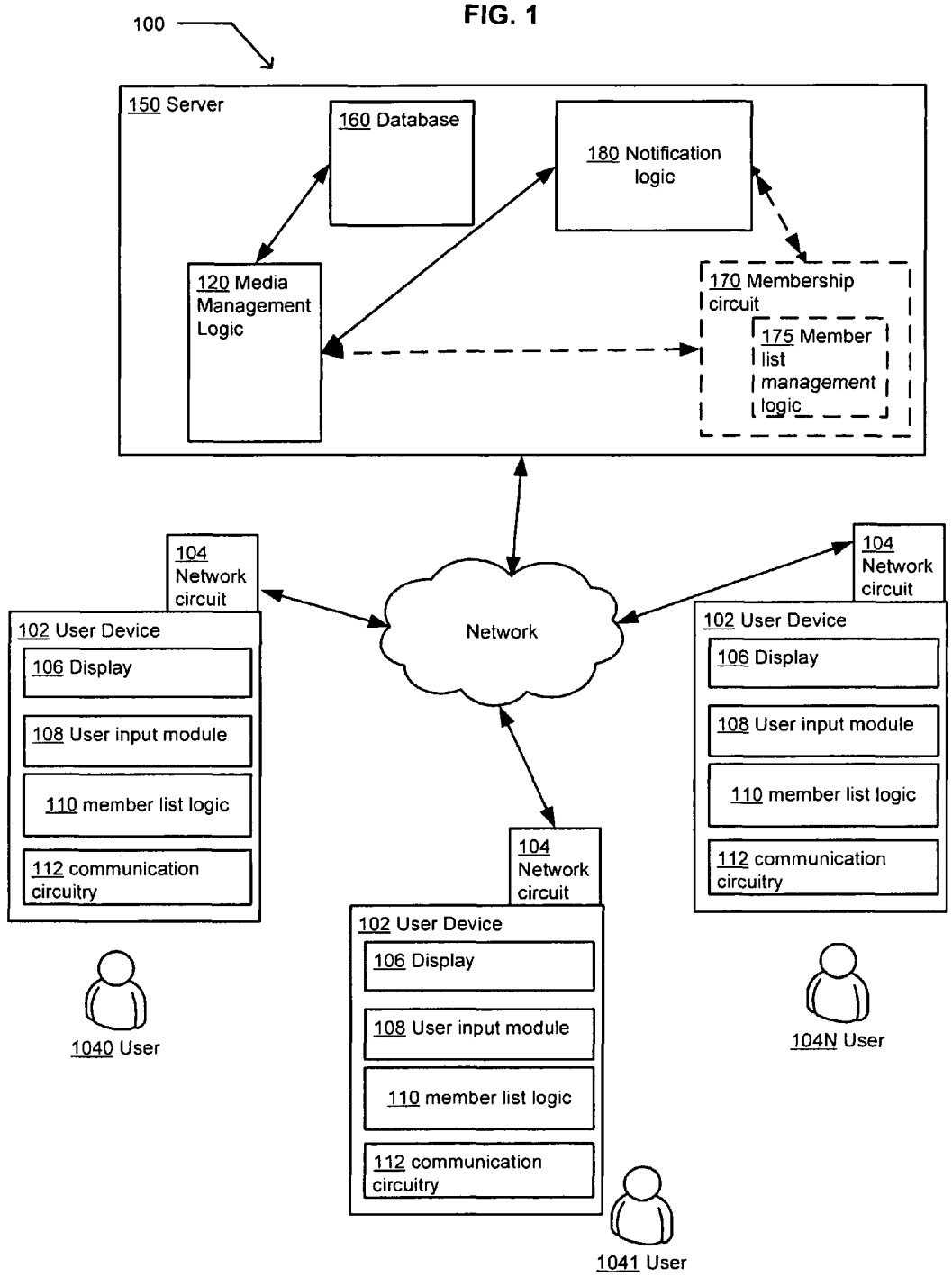
FIG. 1 illustrates an example content distribution system in which an embodiment may be implemented.

FIG. 1 illustrates an example system 100 in which embodiments may be implemented. Generally, the system 100 is operable to provide on-demand content, such as, for example, movies, TV shows, and/or music to a plurality of buddies. As such, the system 100 may be configured receive a request from a user to view a specific movie. The system 100 may be operable to receive a request to send a message to one or more remote users indicating that a specific movie had been selected by a user for viewing. The system 100 may be operable to receive an indication that a remote user has selected the movie identified by the message, and the system may transmit this information to a user. The system 100 may be configured to transmit the movie selected by the user to a remote user who also selected the movie. The system 100 also may be configured to allow a user and remote users to interact with each other during the movie.

The system 100 may include at least one server 150. The server 150 may be used to provide some or all of the functionality just described. For example a server 150 may receive a request for a movie and transmit a notification and/or a movie to at least one user of the system. The server may be a shared resource and may include a content distribution device that may include for example, one or more telephone switches, one or more analog/digital cable head-ends and/or one or more internet servers, etc. The server may be a combination of hardware, and/or software that is operable to connect with users over a network (e.g., over the internet or other network).

The server 150 may consist of circuitry for receiving a request for at least a specific instance of content from a user 1040. For example, media management logic 120 of server 150 receiving a request to view a specified movie stored in a database 160 from user 1040. A more specific example might include, a network circuit receiving a packet indicative of a request to receive streaming video of a documentary film from a human 1040.

The server 150 may include circuitry for receiving a request to notify at least one remote user that said specific instance of said content has been selected by said user. For example and in addition to the preceding example, media management logic 120 receiving a request to send a message to one or more of remote user 1041, . . . , and/or remote user 104N (where N is an integer other than 1) that user 1040 has selected the specified movie for viewing (although the foregoing convention is used throughout for sake of clarity, those skilled in the art will appreciate that in general such requests will be received from one or more devices respectively associated with user 1040 or buddy 1041 . . . 104N). A more specific example might include media management logic 120 receiving a packet indicative of a request to notify at least one buddy 1041 . . . 104N (e.g., such as on a buddy list) of user 1040 that user 1040 has elected to receive streaming video of the-above referenced documentary film.

The server 150 may include circuitry for transmitting a notification to said at least one remote user that said user has selected said specific instance of said content. For example and in addition to the preceding example, media management logic 120 transmitting to one or more of remote user 1041, . . . , and/or remote user 104N a message indicating that user 1040 has selected a specified movie for viewing. A more specific example might include media management logic 120 transmitting to the above-referenced buddies a message (e.g., text, video, and/or voice message) indicating that the above-referenced documentary film has been selected for viewing by user 1040.

The server 150 may include circuitry for receiving an indication that said at least one remote user selected said specific instance of said content. For example and in addition to the preceding example, media management logic 120 receiving a signal from remote user 1041 and/or remote user 104N indicating that remote user 1041 and/or remote user 104N has selected the specified movie for viewing. A more specific example may include media management logic 120 receiving a packet from the above referenced one or more buddies 1041 . . . 104N, wherein the packet contains information indicating that the above referenced one or more buddies 1041 . . . 104N have elected to receive the above referenced streaming video of a documentary film.

The server 150 may comprise circuitry for transmitting said indication that said at least one remote user selected said specific instance of said content to said user. For example and in addition to the preceding example, media management logic 120 transmitting a signal to user 1040 indicating that remote user 1041 . . . 104N have selected the specified movie for viewing. A more detailed example may include media management logic 120 transmitting a packet to user 1040, wherein the packet contains information indicating that the above referenced one or more buddies 1041 . . . 104N have elected to receive the above referenced streaming video of a documentary film.

The server 150 may contain circuitry for transmitting said specific instance of said content to said user and said at least one remote user. For example and in addition to the preceding example, media management logic 120 transmitting the specified movie to user 1040 and one or more remote users 1041, . . . , and/or 104N. More specifically, media management logic 120 streaming video of a documentary film to user 1040 and the above-referenced buddies 1041, . . . , and/or 104N.

The server 150 may include circuitry for enabling interaction between said user and said at least one remote user. For example and in addition to the preceding example, media management logic 120 enabling interaction between a user 1040 and one or more remote users 1041 through 104N. More specifically, media management logic opening a channel for communicating (e.g., opening a push-to-talk, text, video, and/or cellular channel) between the user and one or more buddies.

The server 150 may include circuitry for receiving a request from said user to access a member list, wherein said member list contains said at least one remote user. For example media management logic 120 receiving a request from a user 1040 to access a membership circuit 170 containing a member list updated by member list management logic 175 containing at least one remote user 1041 . . . 104N where (where N is an integer other than 1). More specifically, media management logic 120 receiving a packet indicative of a request to access a buddy list from a user 1040. The buddy list containing information (e.g., information about whether the buddy is online, offline, busy, and/or available to watch a movie) about at least one buddy 1041 . . . 104N.

The server 150 may include circuitry for receiving a request to notify at least one member of a member list that said specific instance of said content has been selected by said user. For example media management logic 120 may receive a request to select at least one remote user 1041 . . . 104N from a member list maintained by member list management logic 175 to send a notification to. An example of this operation may include media management logic 120 receiving a packet indicative of a request to select one or more buddies to send a message to. Where the message indicates that a specific documentary film has been selected for streaming by a user 1040.

In some example embodiments of system 100 the circuitry for transmitting a notification to said at least one remote user that said user has selected said specific instance of said content may include but is not limited to circuitry for transmitting to said user information indicating the status of said at least one remote user. For example, media management logic 120 transmitting the status of at least one remote user 1041 . . . 104N to a user 1040. The media management logic 120 may receive information about the status of at least one remote user 1041 . . . 104N from a membership circuit 170. A more specific example may include media management logic 120 sending a packet containing information about the status of a buddy (e.g., information indicating whether a buddy is online, offline, busy, and/or available to receive a streamed movie) to a user. Another example may include media management logic 120 transmitting information indicating whether a buddy has become momentarily unavailable (e.g., received a telephone call, e-mail, and/or left their device unattended).

In some example embodiments of the system 100 circuitry for transmitting a notification to said at least one remote user that said user has selected said specific instance of said content may include but is not limited to circuitry for transmitting information identifying at least a time for said specific instance of said content. For example, media management logic 120 transmitting to one or more buddies 1041 . . . 104N a message generated by notification logic 180 where the generated message identifies a time for viewing a specific movie. More specifically, media management logic 120 transmitting a packet to at least one buddy 1041 . . . 104N, where the packet is indicative of a message identifying a time for receiving a streamed documentary film.

In some example embodiments of the system 100 circuitry for transmitting a notification to said at least one remote user that said user has selected said specific instance of said content may include but is not limited to circuitry for transmitting a request to modify at least the selection of said specific instance of said content. For example, media management logic 120 transmitting a request to modify the selection of the movie to at least one remote user 1041 . . . 104N. A specific example of this may include media management logic 120 transmitting a packet to at least one buddy 1041 . . . 104N where the packet is indicative of a request for at least one buddy 1041 . . . 104N to pick a different documentary film to stream.

In some example embodiments of the system 100 circuitry for transmitting a notification to said at least one remote user that said user has selected said specific instance of said content may include but is not limited to circuitry for transmitting a request to vote for a desired time for said specific instance of said content. For example, media management logic 120 transmitting a request for one or more remote members 1041 . . . 104N to vote for a time to transmit a specific movie. More specifically, media management logic 120 transmitting a packet indicative of a request for one or more buddies to vote for a time from a list of possible times for the server 150 to stream the desired documentary film. In some instances the possible times are suggested by one or more of user 1040 and/or user 1041 . . . 104N while in other instances the times are pre-specified by server 150.

In some example embodiments of the system 100 the circuitry for transmitting a notification to said at least one remote user that said user has selected said specific instance of said content may include but is not limited to circuitry for transmitting a request to modify at least a time for said specific instance of said content. For example, media management logic 120 transmitting a request to modify the selection of the time for server to transmit a movie to at least one remote user 1041 . . . 104N. More specifically, media management logic 120 transmitting a packet to at least one buddy 1041 . . . 104N where the packet is indicative of a request for at least one buddy 1041 . . . 104N to choose a different time for the server 150 to stream a documentary film to a user and one or more buddies 1041 . . . 104N.

In some example embodiments of the system 100 the circuitry for receiving an indication that said at least one remote user selected said specific instance of said content may include but is not limited to circuitry for receiving information identifying whether said at least one remote user modified a time for said specific instance of said content. For example, media management logic 120 may receive a signal from one or more remote users 1041 . . . 104N indicating that one or more of the remote users changed the time for server 150 to transmit a movie. More specifically, media management logic 120 may receive a packet indicative of a message from one or more buddies 1041 . . . 104N. The packet may contain information indicating that one or more of the buddies 1041 . . . 104N has modified the time that the server 150 was scheduled to stream a documentary film to user and buddies.

In some example embodiments of the system 100 the circuitry for receiving an indication that said at least one remote user selected said specific instance of said content may include but is not limited to circuitry for receiving information identifying whether said at least one remote user modified said said specific instance of said content. For example, media management logic 120 receiving a signal from one or more remote users 1041 . . . 104N such signal indicating that one or more of the remote users changed the specific movie server 150 was scheduled to transmit. A more specific example of this may be media management logic 120 receiving a packet from one or more buddies 1041 . . . 104N. The packet may contain information indicating that one or more buddies 1041 . . . 104N changed the selection of documentary film to stream to user 1040 and/or one or more buddies 1041 . . . 104N.

In some example embodiments of the system 100 the circuitry for receiving an indication that said at least one remote user selected said specific instance of said content may include but is not limited to circuitry for receiving information identifying whether said at least one remote user has voted for a desired time. For example, media management logic 120 receiving a signal indicative of a vote for a desired time for server 150 to transmit a movie. A more specific example may include media management logic 120 receiving a packet from at least one buddy 1041 . . . 104N. Media management logic 120 may parse the received packet for information indicating whether the packet contains a vote, e.g., whether the buddy chose a time from a list of possible times for the server to stream a documentary film. The media management logic 120 may increment an entry in a table corresponding to the time indicated in the packet and determine the most popular time to view a documentary film by determining which time has the most votes. The media management logic 120 may then modify the selection of a time to stream the documentary film at the time with the most votes.

In some example embodiments of the system 100 the circuitry for transmitting said specific instance of said content to said user and said at least one remote user may include but is not limited to circuitry for transmitting a time synchronized specific instance of said content to said user and said at least one remote user. For example, media management logic 120 may transmit a movie synchronously to a user 1040 and at least one remote user 1041 through 104N. More specifically media management logic 120 may stream a documentary film from a database concurrently to a user and at least one buddy 1041 . . . 104N.

In some example embodiments of the system 100 the circuitry for enabling interaction between said user and said at least one remote user may include but is not limited to circuitry for enabling at least said user and/or said at least one remote user to manipulate said specific instance of said content. For example media management logic 120 operable to receive a request to manipulate the movie playing from a user 1040 or a buddy 1041 . . . 104N. More specifically, media management logic operable to receive a packet indicative of a request from a user 1040, a remote buddy 1041 . . . 104N, and/or a by voting majority of users to manipulate (e.g., pause, stop, rewind, or fast forward) and to apply the manipulation concurrently to the streaming documentary film.

In some example embodiments of the system 100 the circuitry for enabling interaction between said user and said at least one remote user may include but is not limited to circuitry for enabling said user and said at least one remote user to communicate with each other. For example, media management logic 120 operable to allow a user 1040 to send a message to at least one remote user 1041 . . . 104N. More specifically, media management logic 120 operable to allow a user to send a message (e.g., voice, video and/or text) over a communication link to at least one buddy 1041 . . . 104N.

In some example embodiments of the system 100 the circuitry for enabling interaction between said user and said at least one remote user may include but is not limited to circuitry for enabling said user and said at least one remote user to communicate with each other during transmission of said specific instance of said content. For example media management logic 120 operable to transmit a movie to user 1040 and remote users 1041 . . . 104N, and media management logic operable to open a communication channel between a user 1040 and at least one remote user 1041 . . . 104N. More specifically, media management logic 120 streaming a documentary film to user and at least one buddy 1041 . . . 104N. Media management logic 120 operable to handle at least one message (e.g., text, video, and/or voice message) to and from a user 1040 to at least one buddy 1041 . . . 104N while the documentary film is being streamed.

Following are a series of flowcharts depicting implementations of processes. For ease of understanding, the flowcharts are organized such that the initial flowcharts present implementations via an overall "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 2:
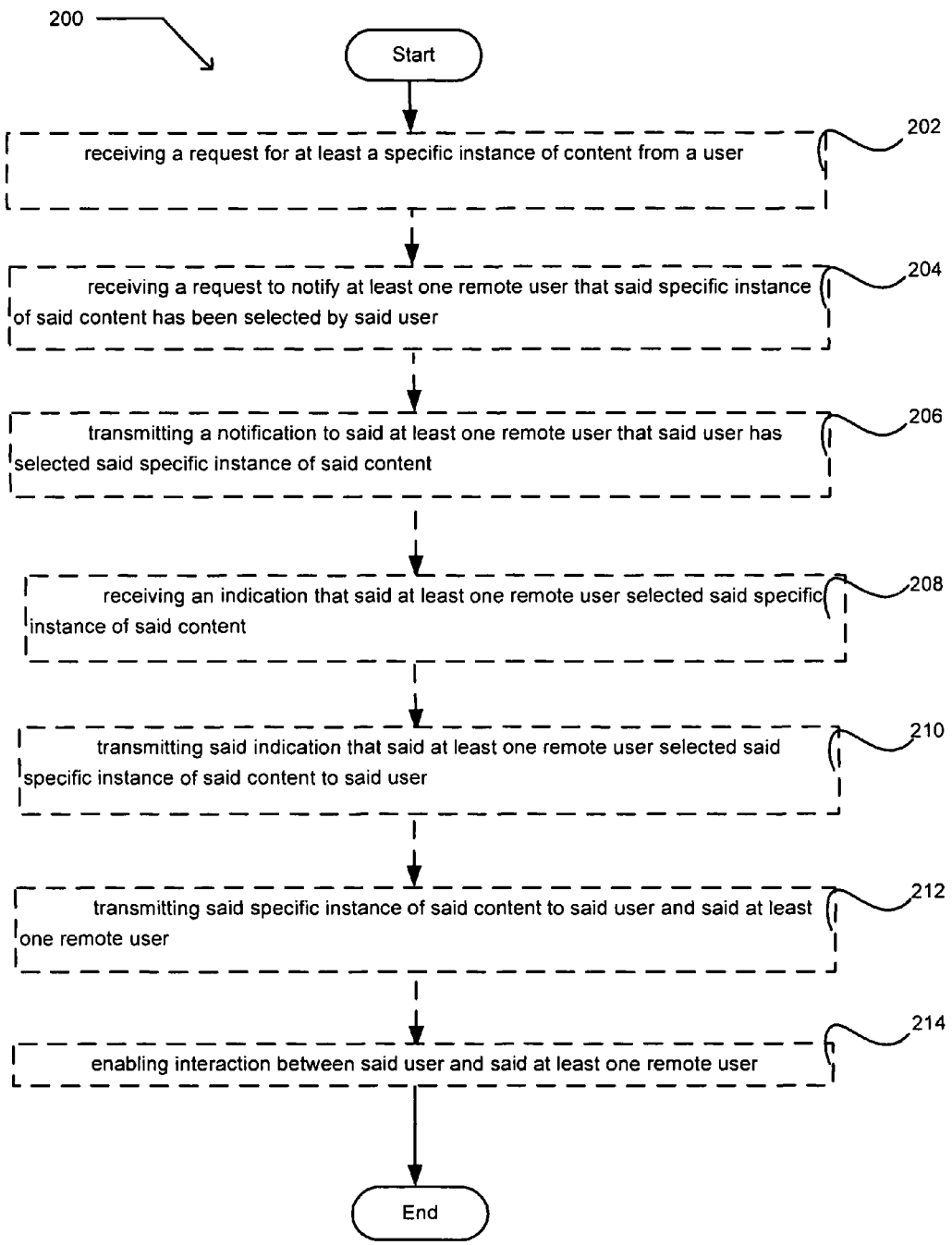
FIG. 2 illustrates an operational flow representing example operations related to techniques for distributing content to users.

FIG. 2 illustrates the operational flow 200 representing example operations relating to distributing content that optionally may include one or more of the operations 200, 202, 204, 206, 208, 210, 212 and/or 214. Those skilled in the art will note that operations 202-214 are indicated by dashed lines, which, in general, is indicative of the fact that such steps are typically to be considered optional, and this is generally true throughout this disclosure with respect to described operations. That is, different implementations will typically employ one or more herein-described operations dependent upon context, and the selection of the appropriate operation(s) appropriate to the various context(s) is within the skill of one in the art in light of the teachings herein.

Operation 200 shows the start of the operational process. Operation 202 shows receiving a request for at least a specific instance of content from a user. For example, media management logic 120 of server 150 receiving a request to view a specified movie stored in a database 160 from user 1040. A more specific example might include network circuit receiving a packet indicative of a request to receive streaming video of a documentary film from a human.

Operation 204 depicts receiving a request to notify at least one remote user that said specific instance of said content has been selected by said user. For example and in addition to the preceding example, media management logic 120 receiving a request to send a message to one or more of remote user 1041, . . . , and/or remote user 104N (where N is an integer other than 1) that user 1040 has selected the specified movie for viewing. A more specific example might include media management logic 120 receiving a packet indicative of a request to notify at least one buddy 1041 . . . 104N (e.g., such as on a buddy list) of the user that the user has elected to receive streaming video of the-above referenced documentary film.

Operation 206 illustrates transmitting a notification to said at least one remote user that said user has selected said specific instance of said content. For example and in addition to the preceding example, media management logic 120 transmitting to one or more of remote user 1041 . . . 104N a message indicating that user 1040 has selected a specified movie for viewing. A more specific example might include media management logic 120 transmitting to the above-referenced buddies 1041 . . . 104N a message (e.g., text, video, and/or voice message) indicating that the above-referenced documentary film has been selected for viewing by a user 1040.

Operation 208 illustrates receiving an indication that said at least one remote user selected said specific instance of said content. For example and in addition to the preceding example, media management logic 120 receiving a signal from remote user 1041 . . . 104N. The signal indicating that remote user 1041 . . . 104N has selected the specified movie for viewing. A more specific example may include media management logic 120 receiving a packet from the above referenced one or more buddies, 1041 . . . 104N wherein the packet contains information indicating that the above referenced one or more buddies 1041 . . . 104N has elected to receive the above referenced streaming video of a documentary film.

Operation 210 shows transmitting said indication that said at least one remote user selected said specific instance of said content to said user. For example and in addition to the preceding example, media management logic 120 transmitting a signal to user 1040 indicating that remote user 1041 . . . 104N have selected the specified movie for viewing. A more detailed example may include media management logic 120 transmitting a packet to user, wherein the packet contains information indicating that the above referenced one or more buddies 1041 . . . 104N have elected to receive the above referenced streaming video of a documentary film.

Operation 212 depicts transmitting said specific instance of said content to said user and said at least one remote user. For example and in addition to the preceding example, media management logic 120 transmitting the specified movie to user 1040 and one or more remote users 1041, . . . , and/or 104N. More specifically, media management logic 120 streaming video of a documentary film to the user and the above-referenced buddies 1041 . . . 104N.

Operation 214 illuminates enabling interaction between said user and said at least one remote user. For example and in addition to the preceding example, media management logic 120 enabling interaction between a user 1040 and one or more remote users 1041 . . . 104N. More specifically, media management logic opening a channel for communicating (e.g., opening a push-to-talk, text, and/or cellular channel) between the user 1040 and one or more buddies 1041 . . . 104N.

Figure 3:
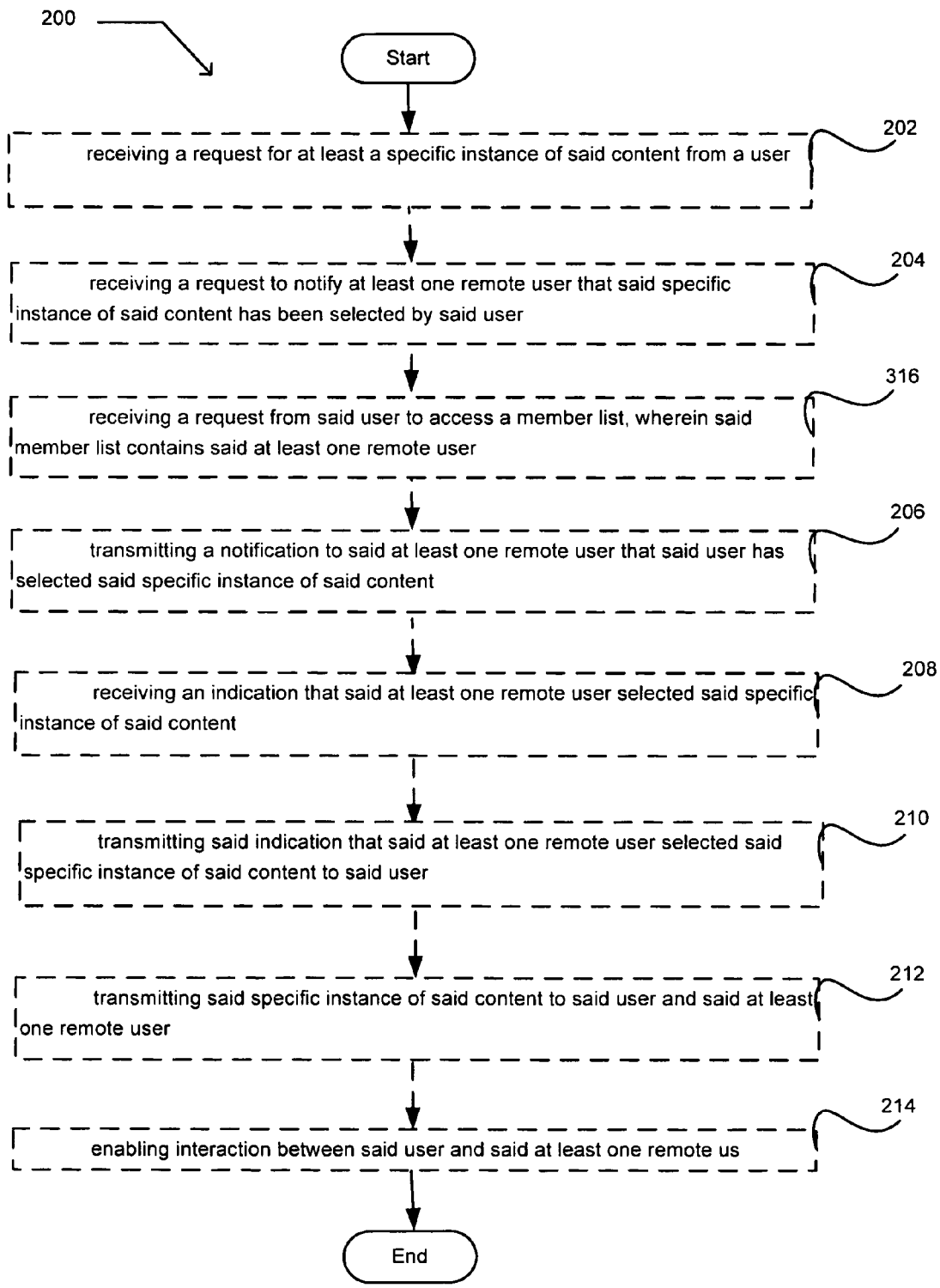
FIG. 3 illustrates an alternative embodiment of the example operational flow of FIG. 2.

FIG. 3 provides an example of the operational sequence 200. While FIG. 3 through FIG. 9 provide additional embodiments of the operation 200 one skilled in the art will recognize that the operational steps illustrated in FIG. 3 through FIG. 9 are examples and other embodiments exist.

FIG. 3 illustrates an alternative embodiment of the example operational flow 200 of FIG. 2. FIG. 3 illustrates an example embodiment where the operational flow of 200 includes operation 316.

Operation 316 shows receiving a request from said user to access a member list, wherein said member list contains said at least one remote user. For example media management logic 120 receiving a request from a user 1040 to access a membership circuit 170 containing a member list updated by member list management logic 175 containing at least one remote user 1041 through 104N where (where N is an integer other than 1). More specifically, media management logic 120 receiving a packet indicative of a request to access a buddy list from a user 1040. The buddy list containing information (e.g., information about whether the buddy is online, offline, busy, and/or available to watch a movie) about at least one buddy 1041 . . . 104N.

Figure 4:
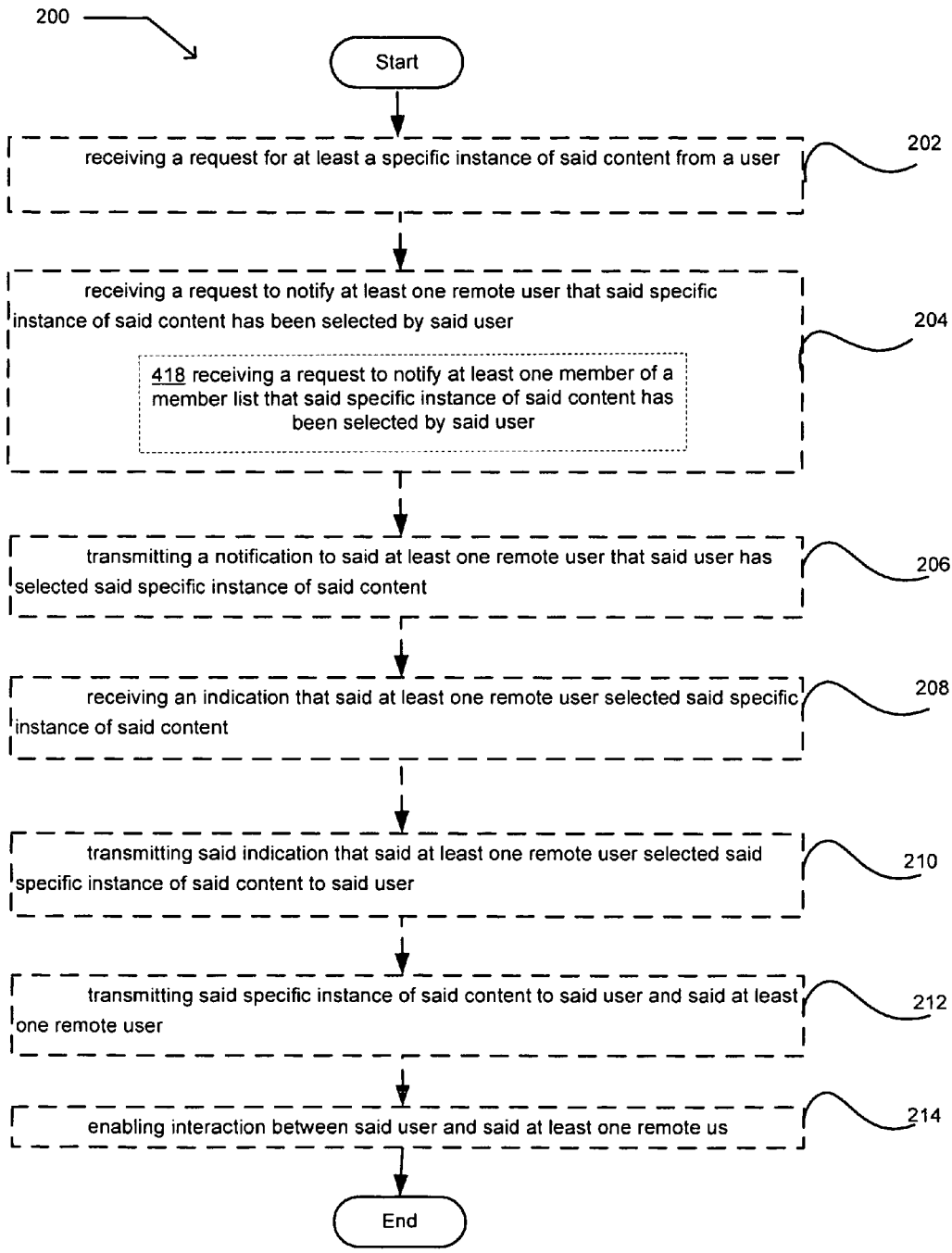
FIG. 4 illustrates an alternative embodiment of the example operational flow of FIG. 2.

FIG. 4 illustrates an alternative embodiment of the example operational flow 200 of FIG. 2. More specifically, FIG. 4 illustrates the operation 204 of receiving a request to notify at least one remote user that said specific instance of said content has been selected by said user including an operational step 418.

The example operation 418 illustrates receiving a request to notify at least one member of a member list that said specific instance of said content has been selected by said user. For example media management logic 120 may receive a request to select at least one remote user 1041 . . . 104N from a member list maintained by member list management logic 175 to send a notification to. An example of this operation may include media management logic 120 receiving a packet indicative of a request to select one or more buddies 1041 . . . 104N to send a message to. Where the message indicates that a specific documentary film has been selected for streaming by a user 1040.

Figure 5:
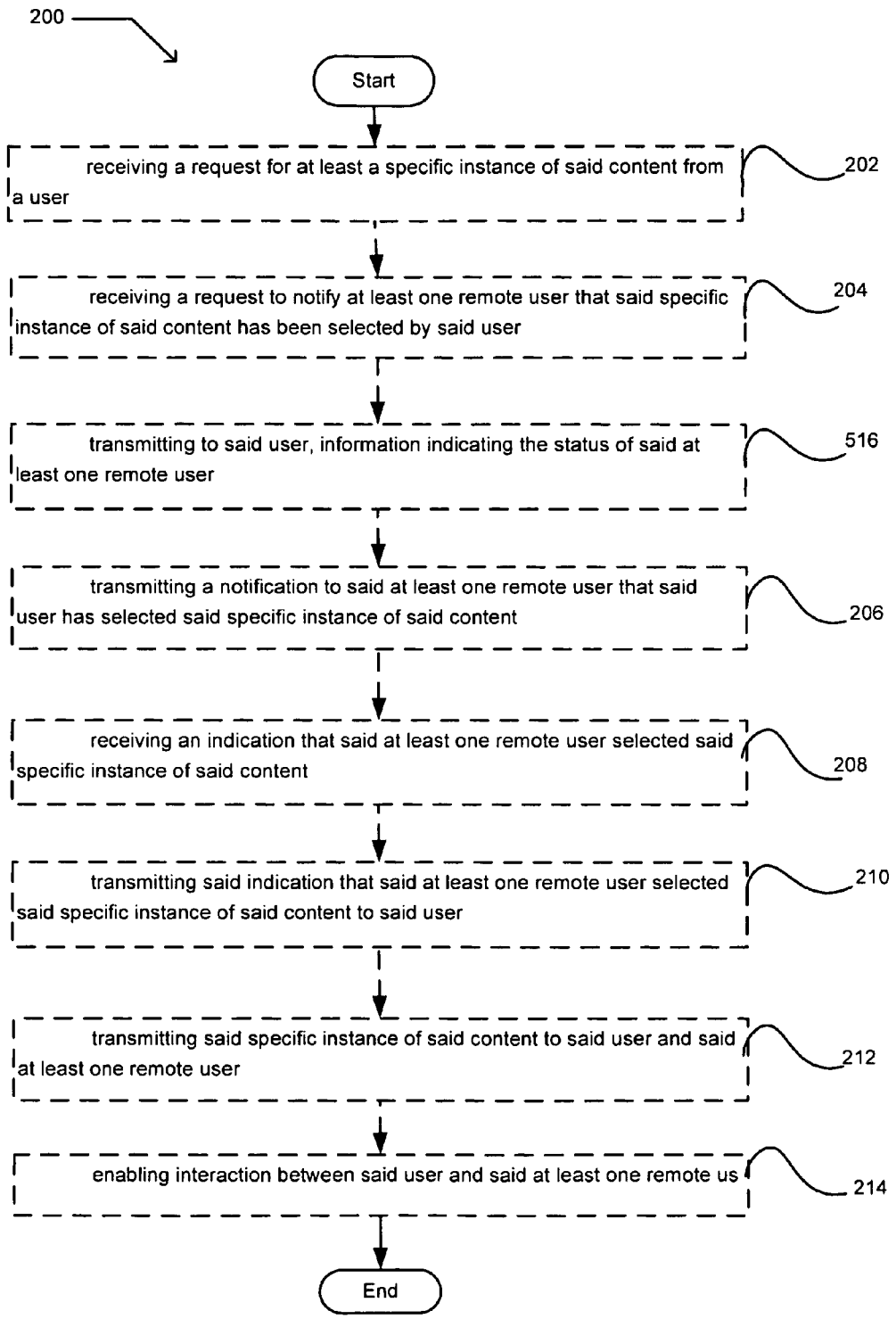
FIG. 5 illustrates an alternative embodiment of the example operational flow of FIG. 2.

FIG. 5 illustrates an alternative embodiment of the example operational flow 200 of FIG. 2. This example embodiment depicts operational step 516.

The example operation 516 shows transmitting to said user information indicating the status of said at least one remote user. For example, media management logic 120 transmitting the status of at least one remote user 1041 . . . 104N to a user 1040, where the media management logic 120 may receive status information from a membership circuit 170. A more specific example may include media management logic 120 sending a packet containing information about the status of a buddy 1041 . . . 104N (e.g., information indicating whether a buddy is online, offline, busy, and/or available to receive a streamed movie) to a user 1040. Another example may include media management logic 120 transmitting information indicating whether a buddy 1041 . . . 104N has become momentarily unavailable (e.g., received a telephone call, e-mail, and/or left their device unattended).

Figure 6:
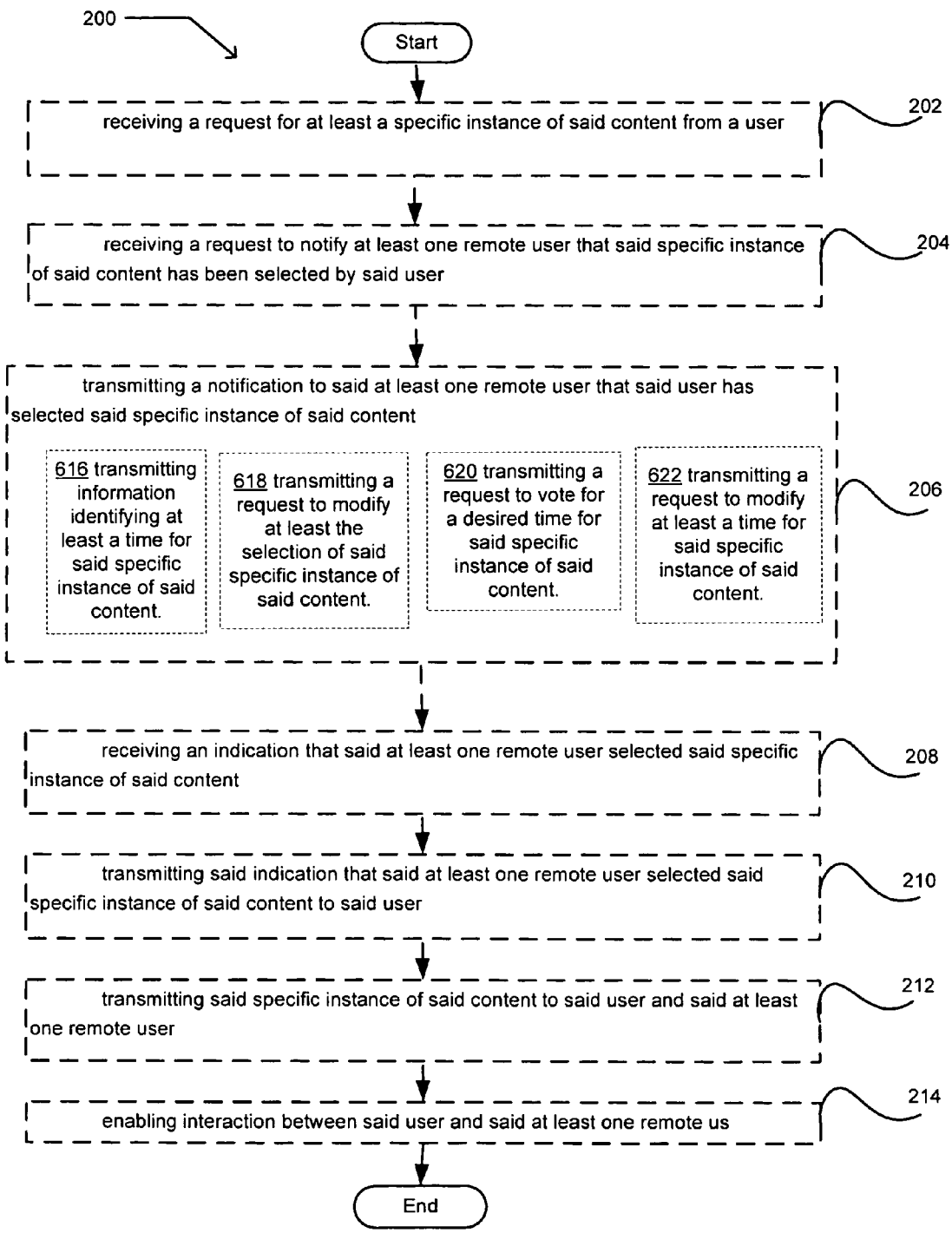
FIG. 6 illustrates an alternative embodiment of the example operational flow of FIG. 2.

FIG. 6 illustrates alternative embodiments of the operational flow 200 of FIG. 2. FIG. 6 illustrates the operation 206 of transmitting a notification to said at least one remote user that said user has selected said specific instance of said content including operation 616, operation 618, operation 620, and/or operation 622.

Operation 616 shows transmitting information identifying at least a time for said specific instance of said content. For example, media management logic 120 transmitting to one or more buddies 1041 . . . 104N a message generated by notification logic 180 where the generated message identifies a time for viewing a specific movie. More specifically, media management logic 120 transmitting a packet to at least one buddy 1041 . . . 104N, where the packet is indicative of a message identifying a time for receiving a streamed documentary film.

Operational step 618 shows transmitting a request to modify at least the selection of said specific instance of said content. For example, media management logic 120 transmitting a request to modify the selection of the movie to at least one remote user 1041 . . . 104N. A specific example of this may include media management logic 120 transmitting a packet to at least one buddy 1041 . . . 104N where the packet is indicative of a request for at least one buddy 1041 . . . 104N to pick a different documentary film to stream.

The additional operational step 620 illustrates transmitting a request to vote for a desired time for said specific instance of said content. For example, media management logic 120 transmitting a request for one or more remote members 1041 . . . 104N to vote for a time to transmit a specific movie. More specifically, media management logic 120 transmitting a packet indicative of a request for one or more buddies 1041 . . . 104N to choose a time from a list of possible times for the server 150 to stream the desired documentary film.

Operational step 622 illustrates an additional operational step of transmitting a request to modify at least the selection of said specific instance of said content. For example, media management logic 120 transmitting a request to modify the selection of the time for server 150 to transmit a movie to at least one remote user 1041 . . . 104N. More specifically, media management logic 120 transmitting a packet to at least one buddy 1041 . . . 104N where the packet is indicative of a request for at least one buddy 1041 . . . 104N to choose a different time for the server 150 to stream a documentary film to a user and one or more buddies 1041 . . . 104N.

Figure 7:
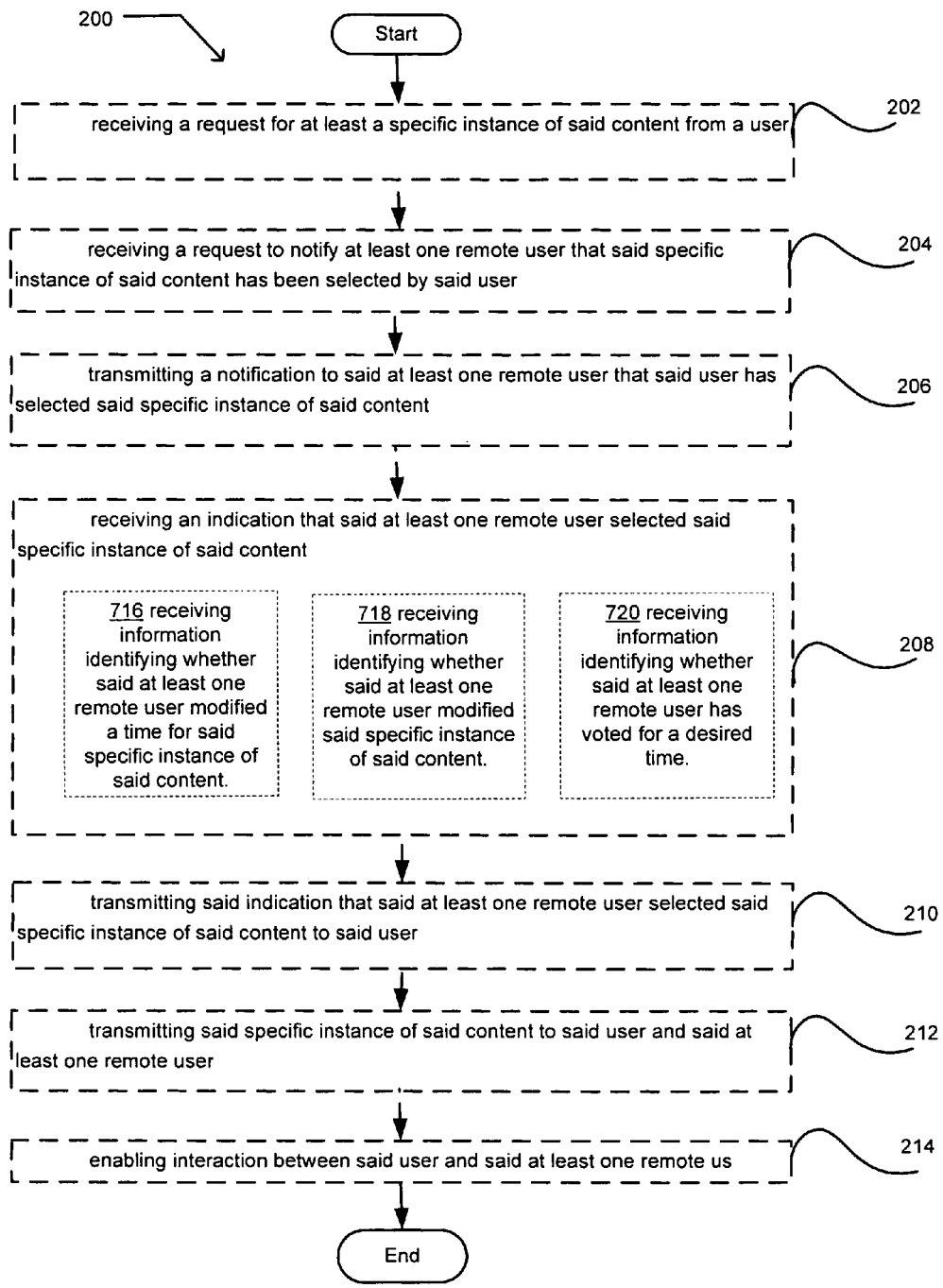
FIG. 7 illustrates an alternative embodiment of the example operational flow of FIG. 2.

FIG. 7 illustrates alternate embodiments of the example operational flow 200. FIG. 7 illustrates the operational step 208 of receiving an indication that said at least one remote user selected said specific instance of said content including operations 716, 718 and/or 720.

The operation 716 shows receiving information identifying whether said at least one remote user modified a time for said specific instance of said content. For example, media management logic 120 may receive a signal from one or more remote users 1041 . . . 104N indicating that one or more of the remote users changed the time for server 150 to transmit a movie. More specifically, media management logic 120 may receive a packet indicative of a message from one or more buddies 1041 . . . 104N. The packet may contain information indicating that one or more of the buddies 1041 . . . 104N has modified the time that the server 150 was scheduled to stream a documentary film to a user 1040 and buddies 1041 . . . 104N.

Operation 718 shows receiving information identifying whether said at least one remote user modified said specific instance of said content. For example, media management logic 120 receiving a signal from one or more remote users 1041 . . . 104N such signal indicating that one or more of the remote users 1041 . . . 104N changed the specific movie server 150 was scheduled to transmit. A more specific example of this may be media management logic 120 receiving a packet from one or more buddies 1041 . . . 104N. The packet may contain information indicating that one or more buddies 1041 . . . 104N changed the selection of documentary film to stream to a user 1040 and one or more buddies 1041 . . . 104N.

Operation 720 shows receiving information identifying whether said at least one remote user has voted for a desired time. For example, media management logic 120 receiving a signal indicative of a vote for a desired time for server 150 to transmit a movie. A more specific example of operation 720 may include media management logic 120 receiving a packet from at least one buddy 1041 . . . 104N. Media management logic 120 may parse the received packet for information indicating whether the packet contains a vote, e.g., whether the buddy chose a time from a list of possible times for the server to stream a documentary film. The media management logic 120 may increment an entry in a table corresponding to the time indicated in the packet and determine the most popular time to view a documentary film by determining which time has the most votes. The media management logic 120 may then modify the selection of a time to stream the documentary film to the time with the most votes.

Figure 8:
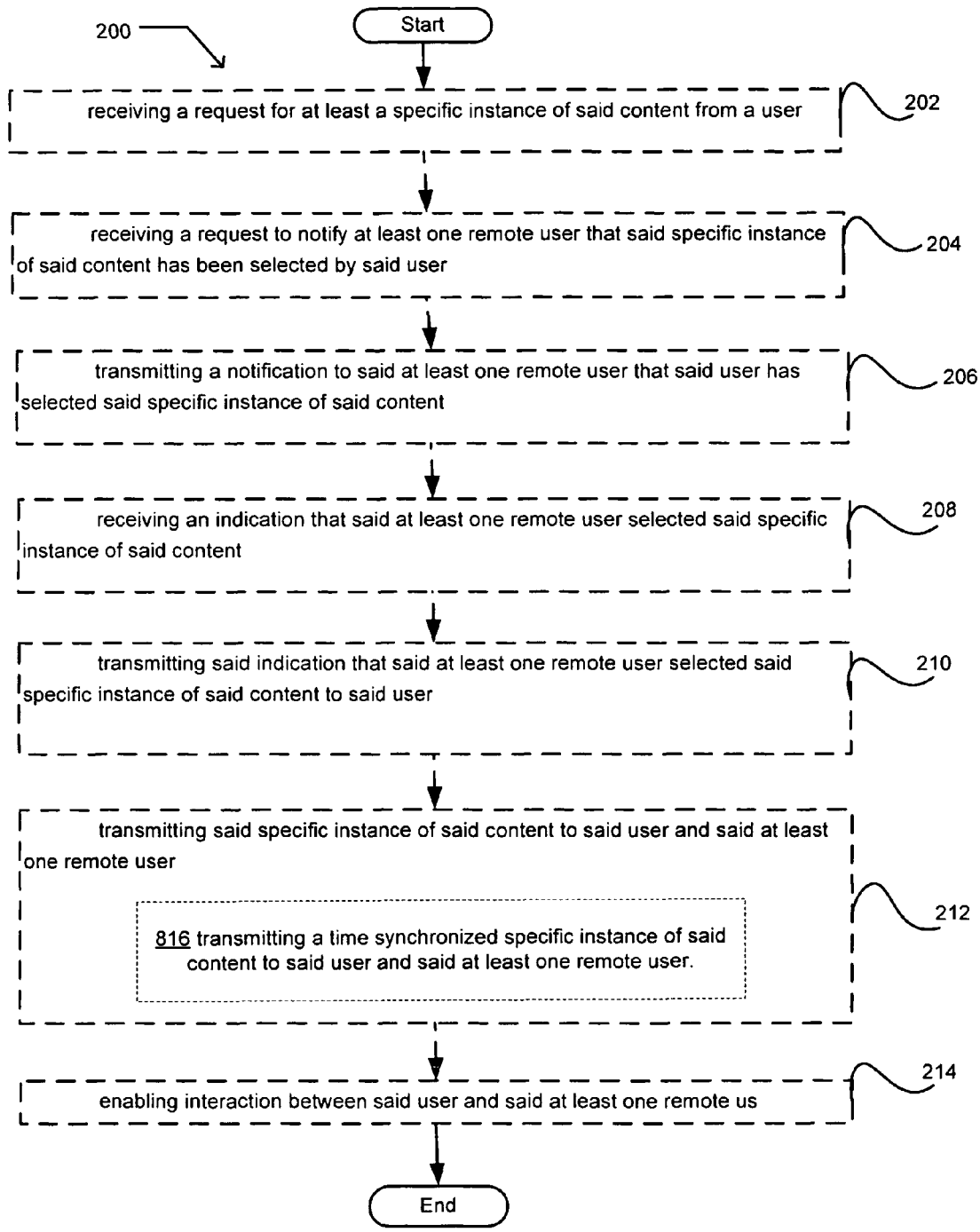
FIG. 8 illustrates an alternative embodiment of the example operational flow of FIG. 2.

FIG. 8 illustrates an alternate embodiment of the example operational flow 200 of FIG. 2. FIG. 8 illustrates the operation 212 of transmitting said specific instance of said content to said user and said at least one remote user including the operation 816.

Operation 816 shows transmitting a time synchronized specific instance of said content to said user and said at least one remote user. For example, media management logic 120 may transmit a movie synchronously to a user 1040 and at least one remote user 1041 through 104N. More specifically media management logic 120 may stream a documentary film from a database 160 concurrently to a user and at least one buddy 1041 . . . 104N.

Figure 9:
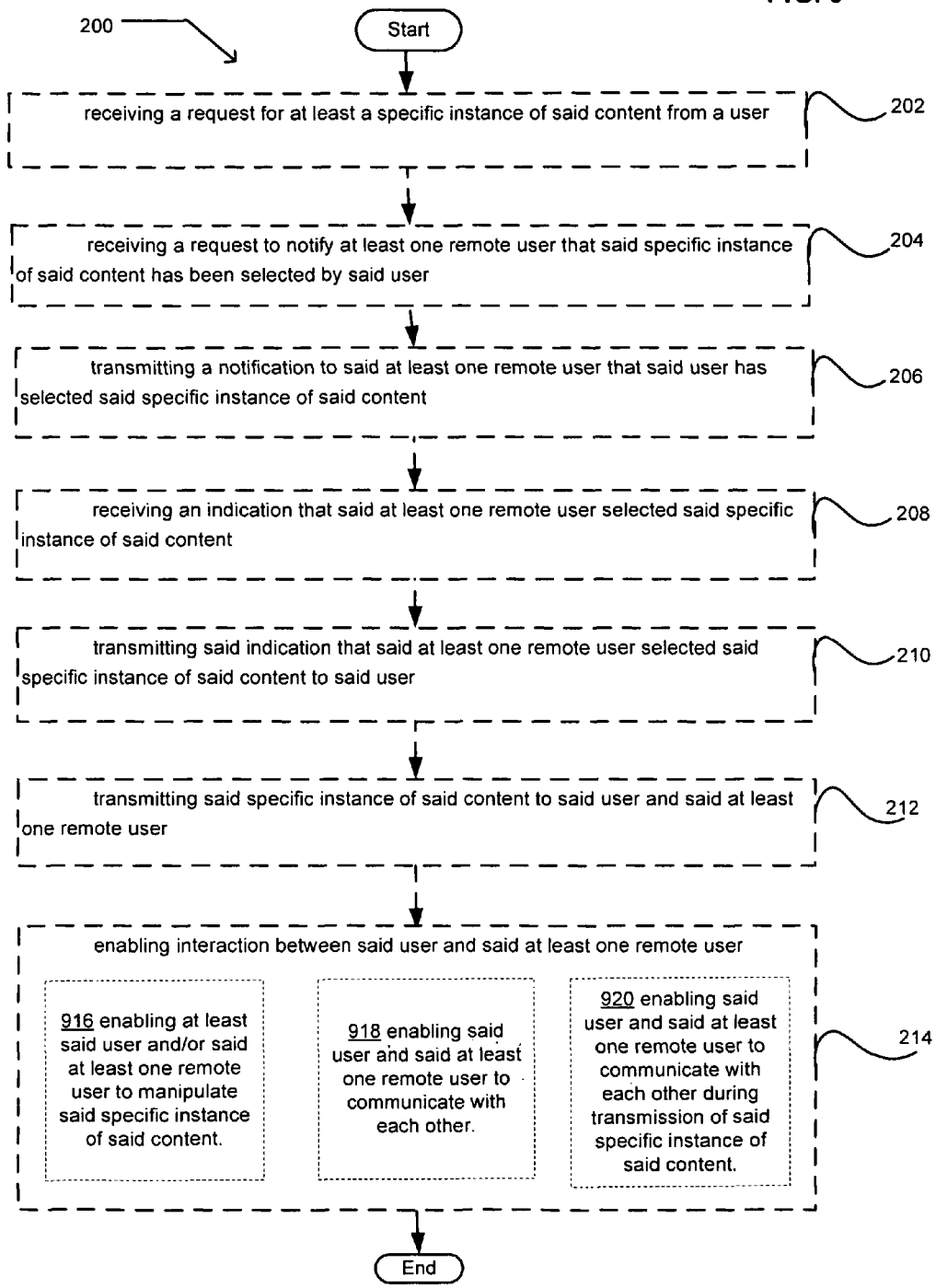
FIG. 9 illustrates an alternative embodiment of the example operational flow of FIG. 2.

FIG. 9 illustrates alternative embodiments of the operational flow 200 of FIG. 2. FIG. 9 illustrates the operational step 214 of enabling interaction between said user and said at least one remote user including operations 916, 918, and/or 920.

Operation 916 shows enabling at least said user and/or said at least one remote user to manipulate said specific instance of said content. For example media management logic 120 operable to receive a request to manipulate the movie playing from a user 1040 or a buddy 1041 . . . 104N (although the foregoing convention is used hereout through for sake of clarity, those skilled in the art will appreciate that in general the such requests will be received from a device associated with user 1040 or buddy 1041 . . . 104N). More specifically, media management logic 120 operable to receive a packet indicative of a request from a user 1040, a remote buddy 1041 . . . 104N, and/or a by voting majority of users to manipulate (e.g., pause, stop, rewind, or fast forward) and to apply the manipulation concurrently to the streaming documentary film.

Operational step 918 shows enabling said user and said at least one remote user to communicate with each other. For example, media management logic 120 operable to allow a user 1040 to send a message to at least one remote user 1041 . . . 104N. More specifically, media management logic 120 operable to allow a user 1040 to send a message (e.g., voice, video and/or text) over a communication link to at least one buddy 1041 . . . 104N.

Operational step 920 shows enabling said user and said at least one remote user to communicate with each other during transmission of said specific instance of said content. For example media management logic 120 operable to transmit a movie to user 1040 and remote users 1041 . . . 104N, and media management logic operable to open a communication channel between a user 1040 and at least one remote user 1041 . . . 104N. More specifically, media management logic 120 streaming a documentary film to user 1040 and at least one buddy 1041 . . . 104N. Media management logic 120 operable to handle at least one message (e.g., text, video, and/or voice message) to and from a user 1040 to at least one buddy 1041 . . . 104N while the documentary film is being streamed.

Figure 10:
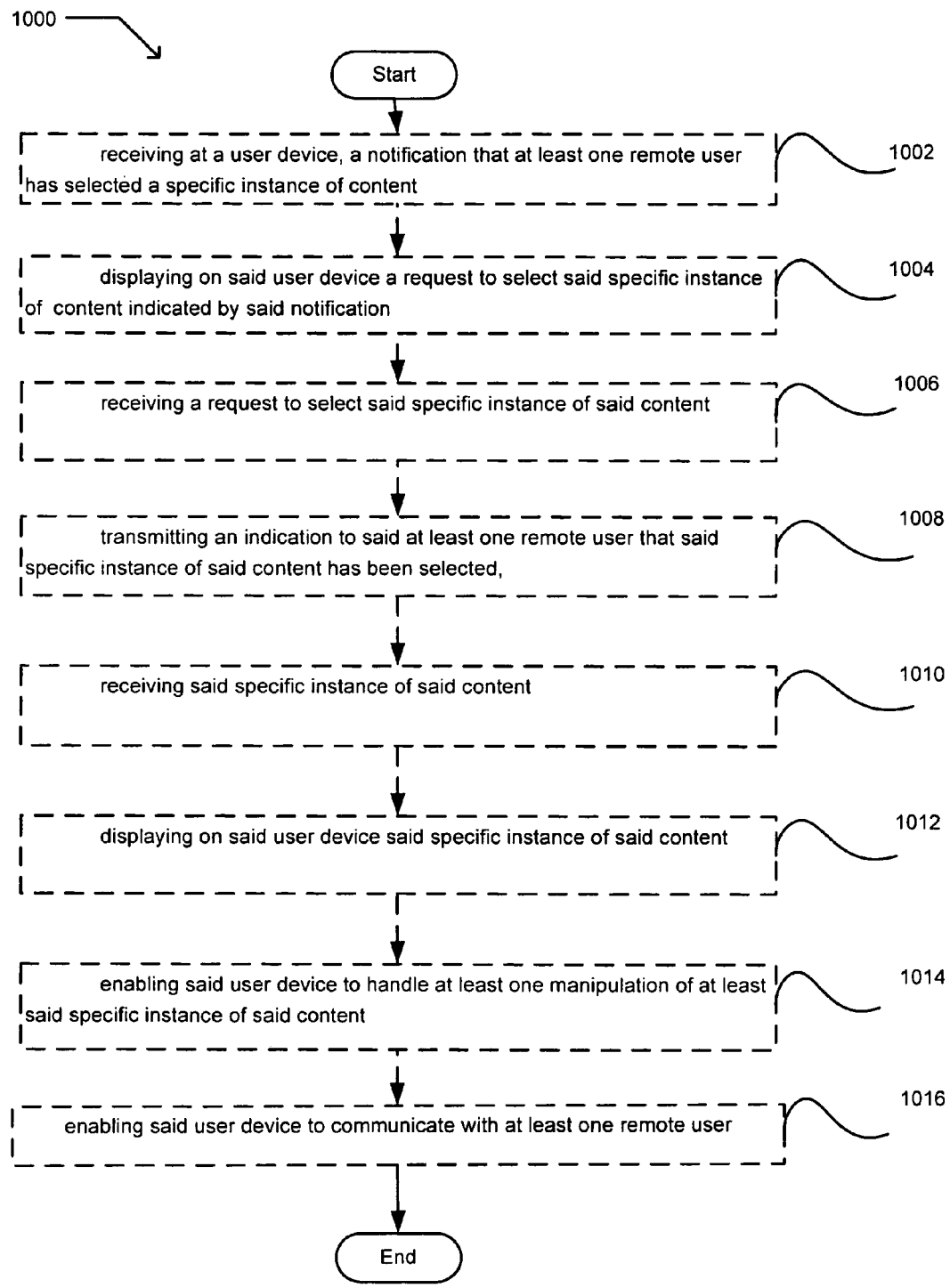
FIG. 10 illustrates an alternative embodiment of the example operations related to techniques for receiving content.

FIG. 10 illustrates the operational flow 1000 representing example operations relating to receiving content that optionally may include one or more of the operations 1000, 1002, 1004, 1006, 1008, 1010, 1012, 1014 and/or 1016.

Operation 1002 shows the start of the operational process. Operational step 1002 shows receiving at a user device, a notification that at least one remote user has selected a specific instance of content For example, user device 102 having a network circuit 104 receiving a signal indicative of a message that one or more remote users 1041 . . . 104N (where N is an integer greater than 1) has selected a specific movie for joint viewing. More specifically, operation 1002 shows receiving at a user device 102 (e.g., PDA, Cellular phone, Laptop Computer) a packet indicative of a message from at least one member of a buddy list, the message indicating that at least one buddy has selected a documentary film for joint viewing.

Operation 1004 shows displaying on said user device a request to select said specific instance of content indicated by said notification. For example and in addition to the preceding example user device 102 having a display 106 operable to display a request received from network circuit 104. More specifically, a LCD screen 106 on a cellular phone 102 displaying data indicative of a request for a user to join at least one buddy 1041 . . . 104N in viewing a documentary film.

Operational step 1006 shows receiving a request to select said specific instance of said content. For example and in addition to the preceding example user device 102 having a user input module 108 operable to receive an indication that user 1040 has selected the specified movie for viewing. A more specific example would be a user device 102 (e.g., cellular phone, PDA, Laptop, and/or TV) having a user input module 108 (e.g., touchpad, keyboard, remote control, voice recognition module) operable to receive at least one command from a user 1040 to select the documentary film for viewing.

Operational step 1008 shows transmitting an indication to said at least one remote user that said specific instance of said content has been selected. For example and in addition to the preceding example user device 102 transmitting a signal from a network circuit 104 indicating that a user 1040 has selected the specified movie for viewing to at least one remote user 1041 . . . 104N. More specifically, a cellular phone 102 transmitting over an antenna 104 a packet indicative of the user's selection of the specified documentary film for viewing to at least one buddy 1041 . . . 104N.

Operational step 1010 illustrates receiving said specific instance of said content. For example and in addition to the preceding example network circuit 104 receiving a movie. A more specific example being a device 102 (e.g., cellular phone, PDA, Laptop Computer) with a network connection 104 (e.g., antenna, Ethernet port, coax cable interface) receiving a documentary film over the network connection 104.

Operational step 1012 illustrates displaying on said user device said specific instance of said content. For example and in addition to the preceding example, display 106 displaying a movie. More specifically, a LCD screen 106 displaying a documentary film.

Operational step 1014 shows enabling said user device to handle at least one manipulation of at least said specific instance of said content. For example and in addition to the preceding example, user input module 108 operable to receive a command to manipulate the displayed movie and operable to display the manipulation on the device's screen. Additionally a network circuit 104 operable to transmit a command to a server 150 indicating that the user 1040 manipulated the displayed movie. More specifically, user input module 108 operable to receive a user command to manipulate (e.g., pause, stop, play, fast forward, and/or rewind) the streaming documentary film. An antenna 104 operable to transmit at least one user command to manipulate the documentary film to a server 150 and a LCD screen 106 operable to display the manipulated documentary film.

Operational step 1016 shows enabling said user device to communicate with at least one remote user. For example and in addition to the preceding example, network circuit 104 configured to communicate with at least one remote user 1041 . . . 104N. More specifically, cellular phone 102 operable to communication (e.g., over text, cellular, video, and/or push to talk) over a network connection 104 (e.g., antenna, Ethernet port, coax cable interface) to at least one buddy 1041 . . . 104N.

FIG. 11 through FIG. 15 provide additional embodiments of the operation 1000 of FIG. 10. One skilled in the art will recognize that the operations illustrated in FIG. 11 through FIG. 15 are exemplary.

Figure 11:
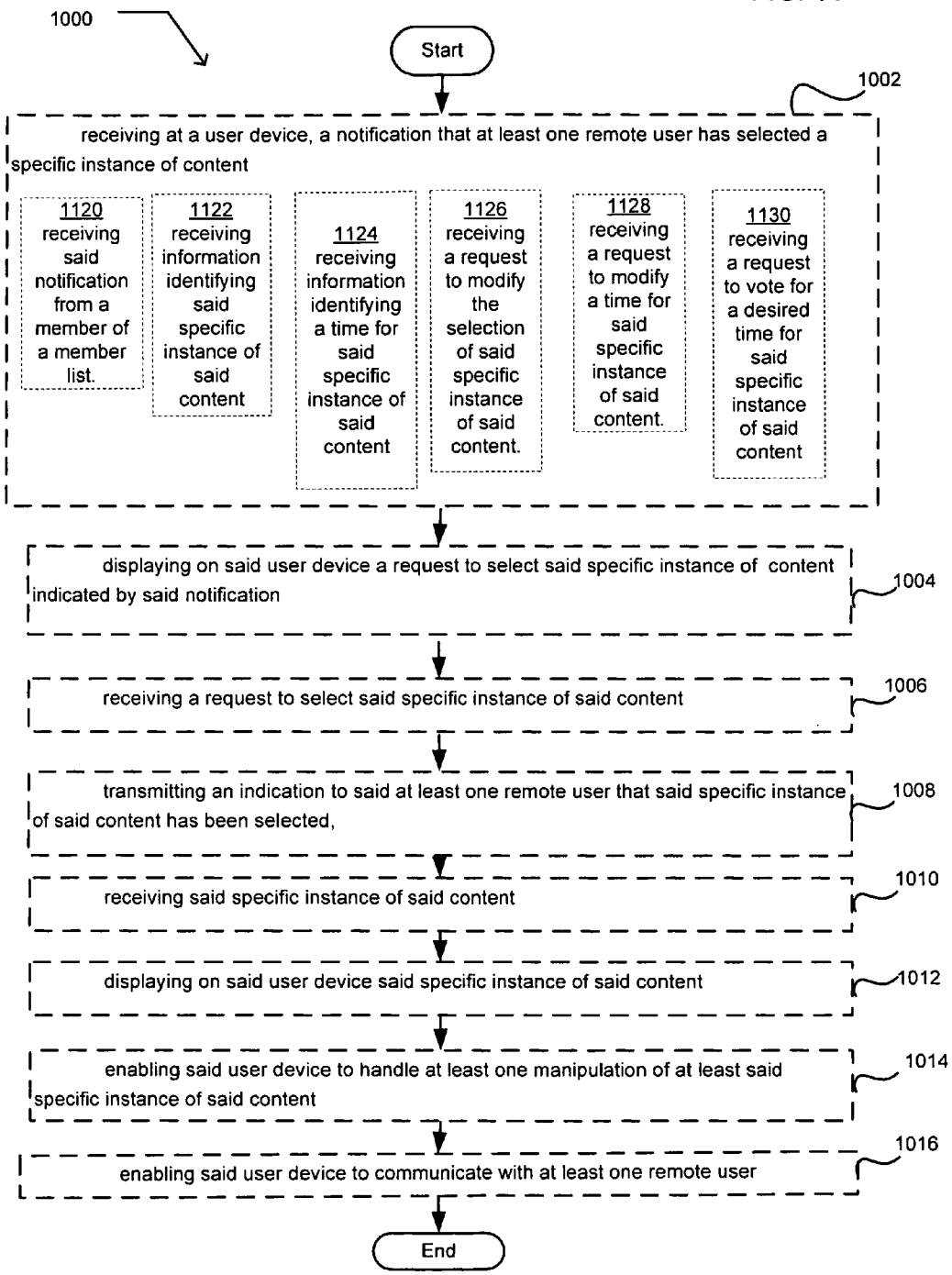
FIG. 11 illustrates an alternative embodiment of the example operational flow of FIG. 10.

FIG. 11 illustrates alternative embodiments of the example operational flow 1000 of FIG. 10. FIG. 11 illustrates the operational step 1002 of receiving at a user device, a notification that at least one remote user has selected a specific instance of content including operations 1120, 1122, 1124, 1126, 1128, and/or 1130.

Operational step 1120 shows receiving said notification from a member of a member list. For example network circuit 104 receiving a notification from a member 1041 . . . 104N of a member list 110. More specifically, antenna receiving a packet indicative of a message from a buddy 1041 . . . 104N contained in a buddy list 110.

Operational step 1122 includes receiving information identifying said specific instance of said content. For example, network 104 receiving a notification containing information identifying a specific movie for viewing. More specifically, antenna 104 of cellular phone 102 receiving a packet indicative of a notification where the notification contains information identifying a documentary film for viewing.

Operational step 1124 shows receiving information identifying a time for said specific instance of said content. For example, network circuit 104 receiving information identifying a specific time for viewing a specified movie. More specifically, network circuit 104 of cellular device 102 receiving a packet indicative of a notification. The notification may contain information identifying a specific time for a server 150 to stream a documentary film to a user.

Optional operational step 1126 illustrates receiving a request to modify the selection of said specific instance of said content. For example network circuit 104 may receive a request to modify the current selection of a movie. More specifically, cellular phone 102 with antenna 104 receiving a packet indicative of a request to change the documentary film to be streamed.

Optional operational step 1128 includes receiving a request to modify a time for said specific instance of said content. For example network circuit 104 may receive a request to modify the time for server 150 to stream the selected movie. More specifically, cellular phone 102 with antenna 104 receiving a packet indicative of a request to change the time for the streaming movie service provider 150 to stream the selected documentary film.

Optional operational step 1130 shows receiving a request to vote for a desired time for said specific instance of said content. For example, user device 102 with network circuit 104 receiving a request for a user 1040 to vote on one or more optional times for the server 150 to transmit the selected movie. More specifically, cellular phone 102 with network circuit 104 receiving a request for a user to select a time from a list of choices for server 150 to stream the selected documentary film.

Figure 12:
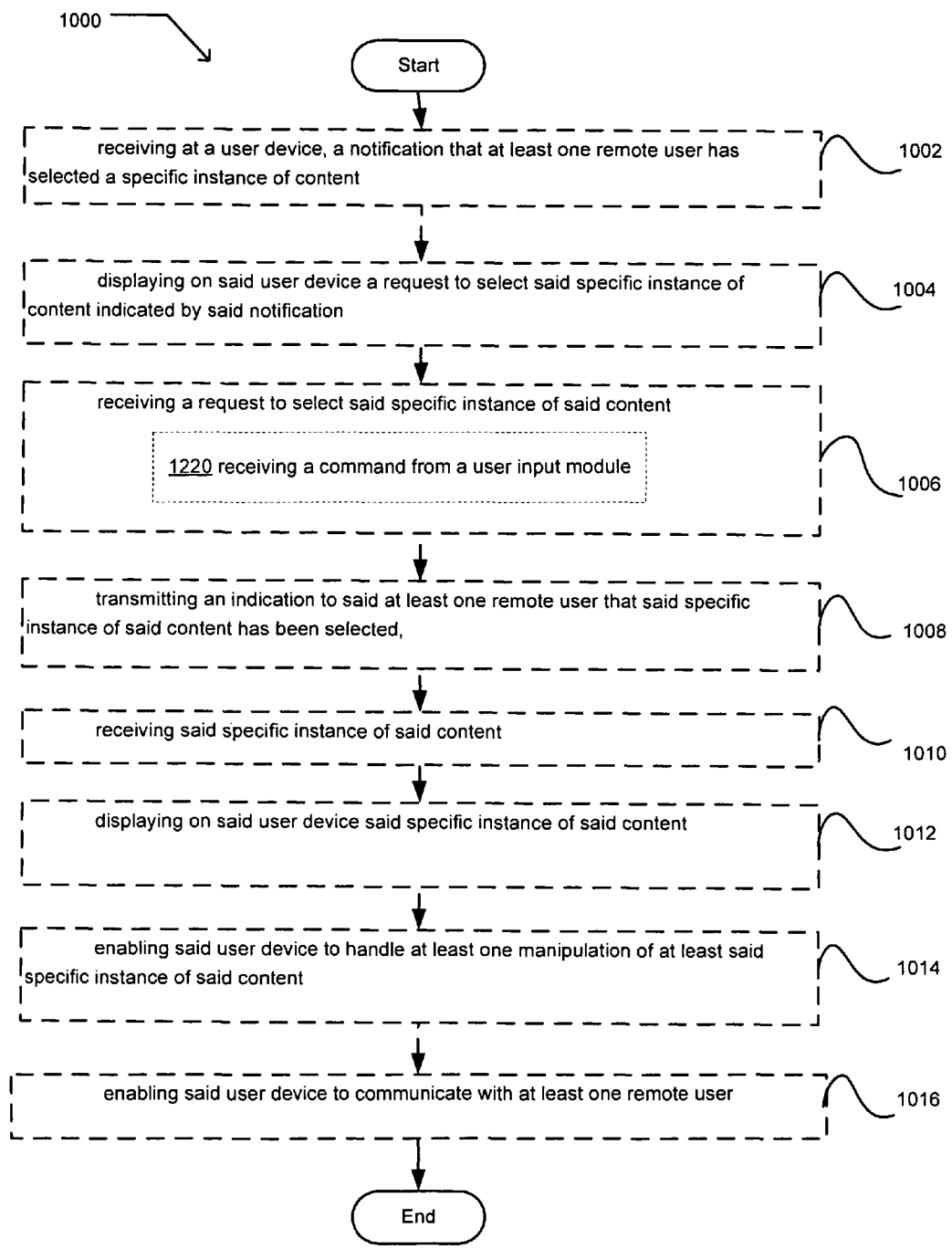
FIG. 12 illustrates an alternative embodiment of the example operational flow of FIG. 10.

FIG. 12 illustrates an alternative embodiment of the example operational flow 1000 of FIG. 10. FIG. 12 illustrates the operational step 1006 of receiving a request to select said specific instance of said content may include the operation 1220.

Operational step 1220 shows receiving a command from a user input module. For example user device 102 receiving a command from a user 1040 through a user input module 108. More specifically, cellular phone 102 receiving voice command from a speaker 108.

Figure 13:
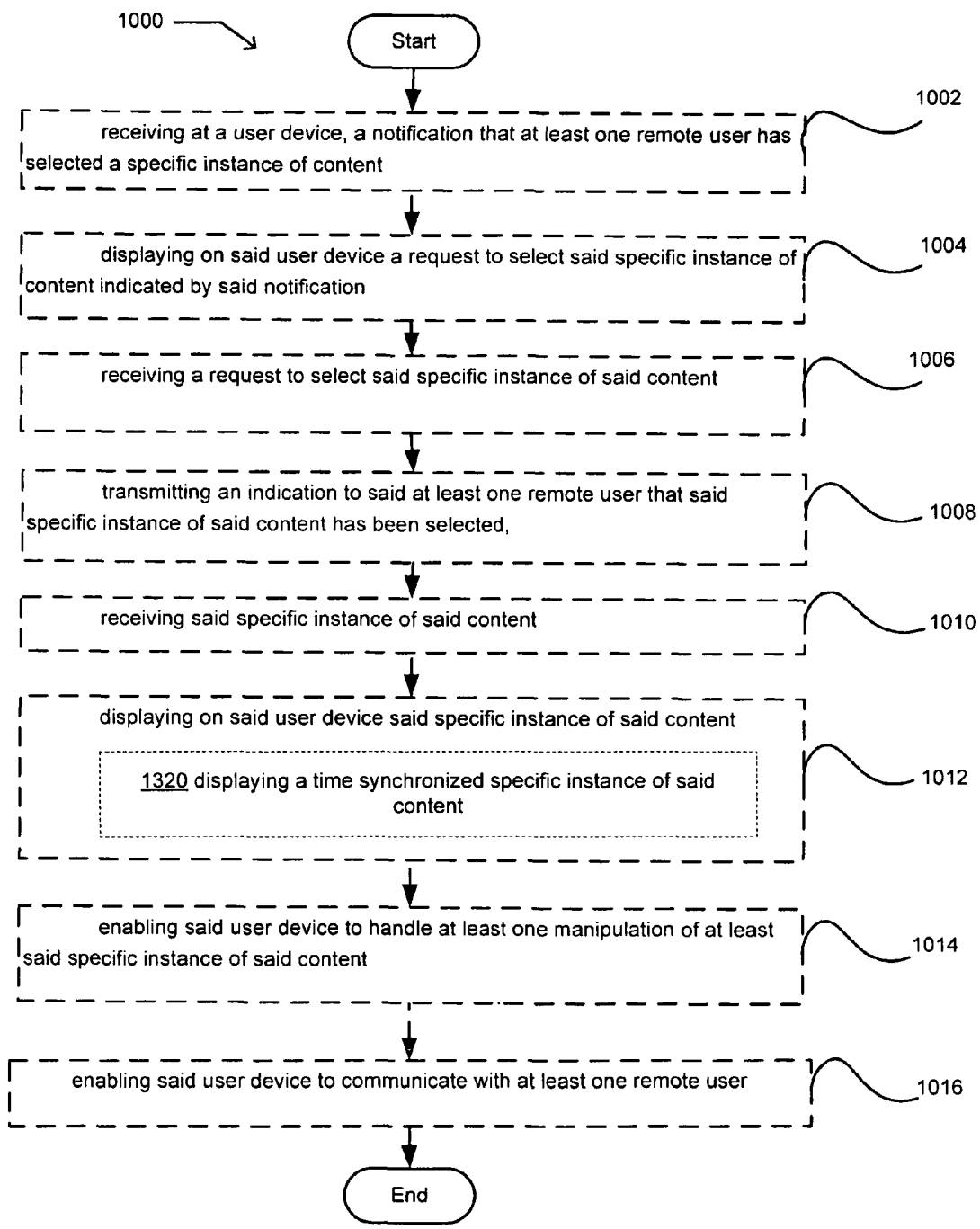
FIG. 13 illustrates an alternative embodiment of the example operational flow of FIG. 10.

FIG. 13 illustrates alternative embodiments of the example operational flow 1000 of FIG. 10. FIG. 13 illustrates the operational step 1012 of displaying on said user device said specific instance of said content including operation 1320.

Operational step 1320 shows displaying a time synchronized specific instance of said content. For example user device 102 displaying on a screen 106 a time synchronized specific instance of a movie. More specifically, cellular phone 102 displaying on a LCD screen 106 a specific documentary film streamed from a streaming movie service provider 150. The documentary film being streamed synchronously to a user and at least one buddy 1041 . . . 104N.

Figure 14:
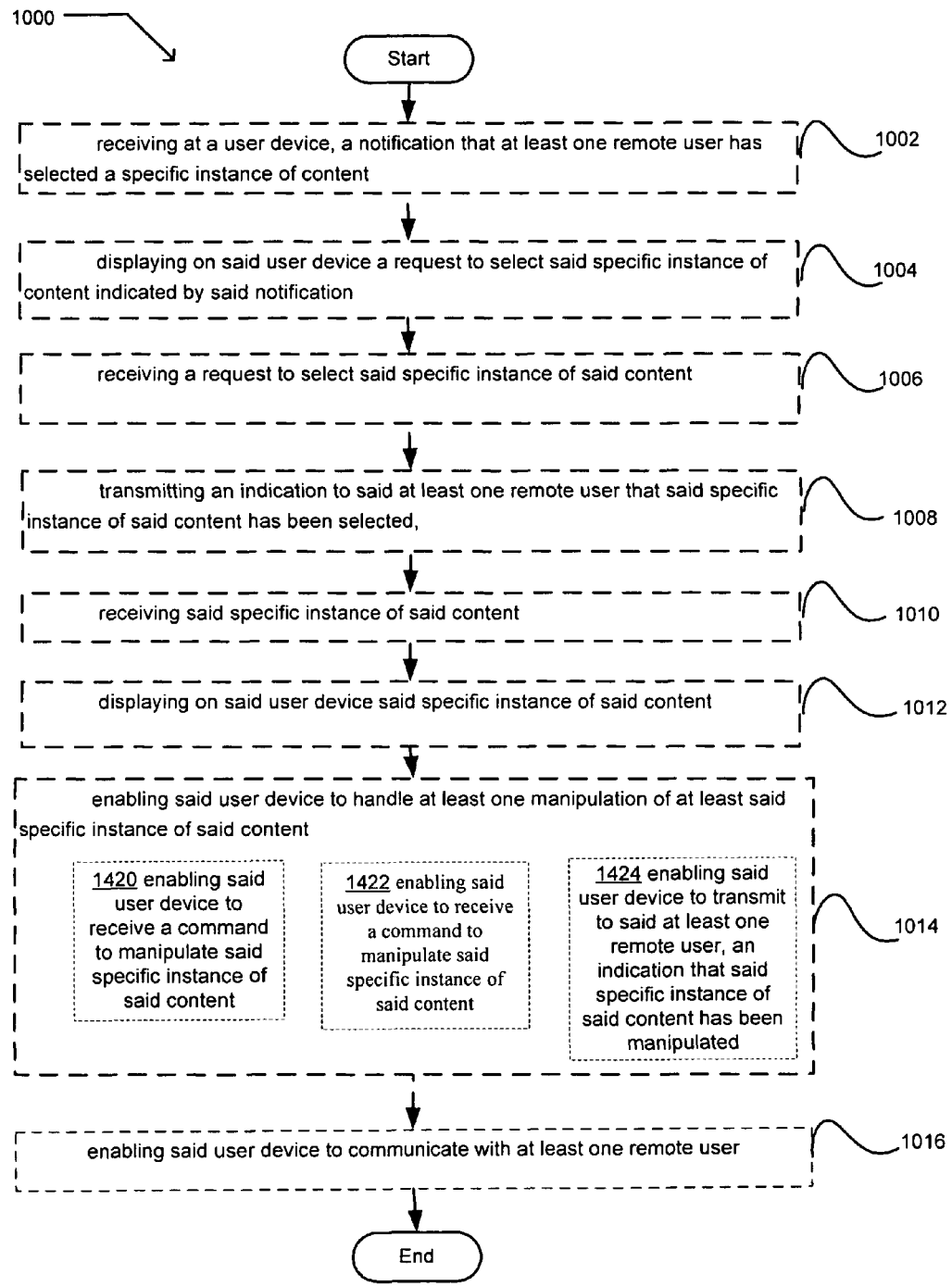
FIG. 14 illustrates an alternative embodiment of the example operational flow of FIG. 10.

FIG. 14 illustrates alternative embodiments of the example operational flow 1000 of FIG. 10. FIG. 14 shows the operation 1014 of enabling said user device to handle at least one manipulation of at least said specific instance of said content including operations 1420, 1422, and/or 1424.

Operational step 1420 shows enabling said user device to receive a manipulated specific instance of said content. For example communication circuitry 112 configuring user device 102 to receive a modified movie. More specifically, device 102 (e.g., cellular phone, TV, Laptop computer) receiving from a network circuit 104 (e.g., antenna, Ethernet port, coax cable connector) a transmitted (e.g., streamed, or downloaded) documentary film that has been modified (e.g., paused, stopped, and/or started) by at least one buddy 1041 . . . 104N.

Operational step 1422 shows enabling said user device to receive a command to manipulate said specific instance of said content. For example, communication circuitry 112 configuring user device 102 to receive a command through a user input module 108 to manipulate the movie being viewed. More specifically, a user's cellular phone 102 configured to receive a command on a touchpad to manipulate (e.g., pause, play, stop, fast forward, and/or rewind) the streamed documentary film.

Operational step 1424 shows enabling said user device to transmit to said at least one remote user, an indication that said specific instance of said content has been manipulated. For example communication circuitry 112 configuring a user device 102 to transmit an indication that user 1040 has manipulated the movie being viewed. More specifically, communication circuitry configuring a user's cellular phone 102 to transmit a packet indicative of a received command (e.g., indicative of a user touching a button on a touchpad) to manipulate (e.g., pause, play, stop, fast forward, and/or rewind) the streaming documentary film.

Figure 15:
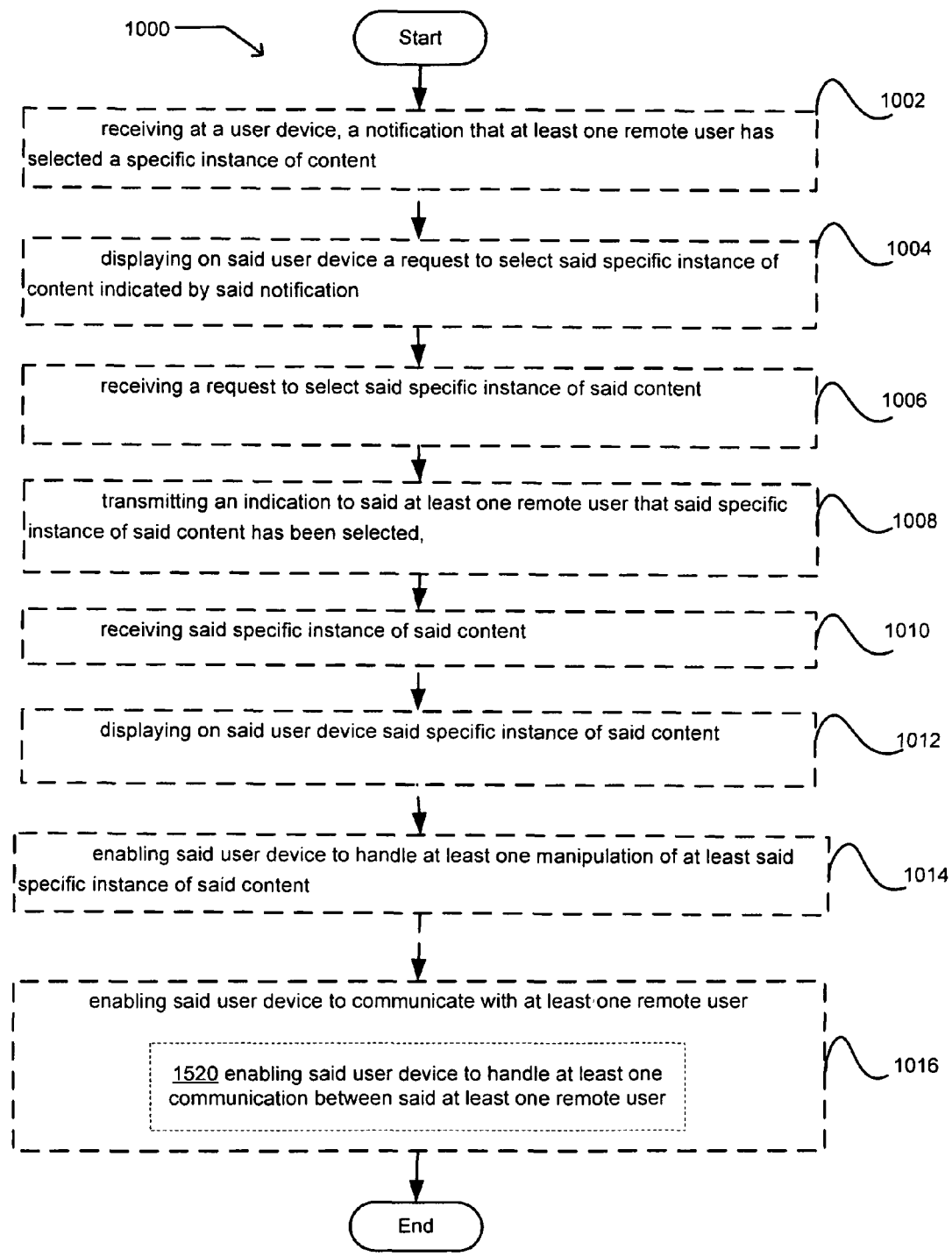
FIG. 15 illustrates an alternative embodiment of the example operational flow of FIG. 10.

FIG. 15 illustrates an alternative embodiment of the example operational flow 1000 of FIG. 10. FIG. 15 shows the operational step 1016 of enabling said user device to communicate with at least one remote user including the operational step 1520.

Operational step 1520 shows enabling said user device to handle at least one communication between said at least one remote user. For example communication circuitry 112 configuring user device 102 to send at least one message to at least one remote user 1041 . . . 104N. Another example being communication circuitry 112 configuring user device 102 to receive at least one message from at least one remote user 1041 . . . 104N. More specifically, communication circuitry configuring cellular phone 102 for user to send a message (e.g., text, cellular, and/or push to talk) to at least one buddy 1041 . . . 104N. Another specific example would be communication circuitry configuring a cellular phone 102 for a user 1040 to receive a message (e.g., text, video, cellular, and/or push to talk) from at least one buddy 1041 . . . 104N.

Figure 16:
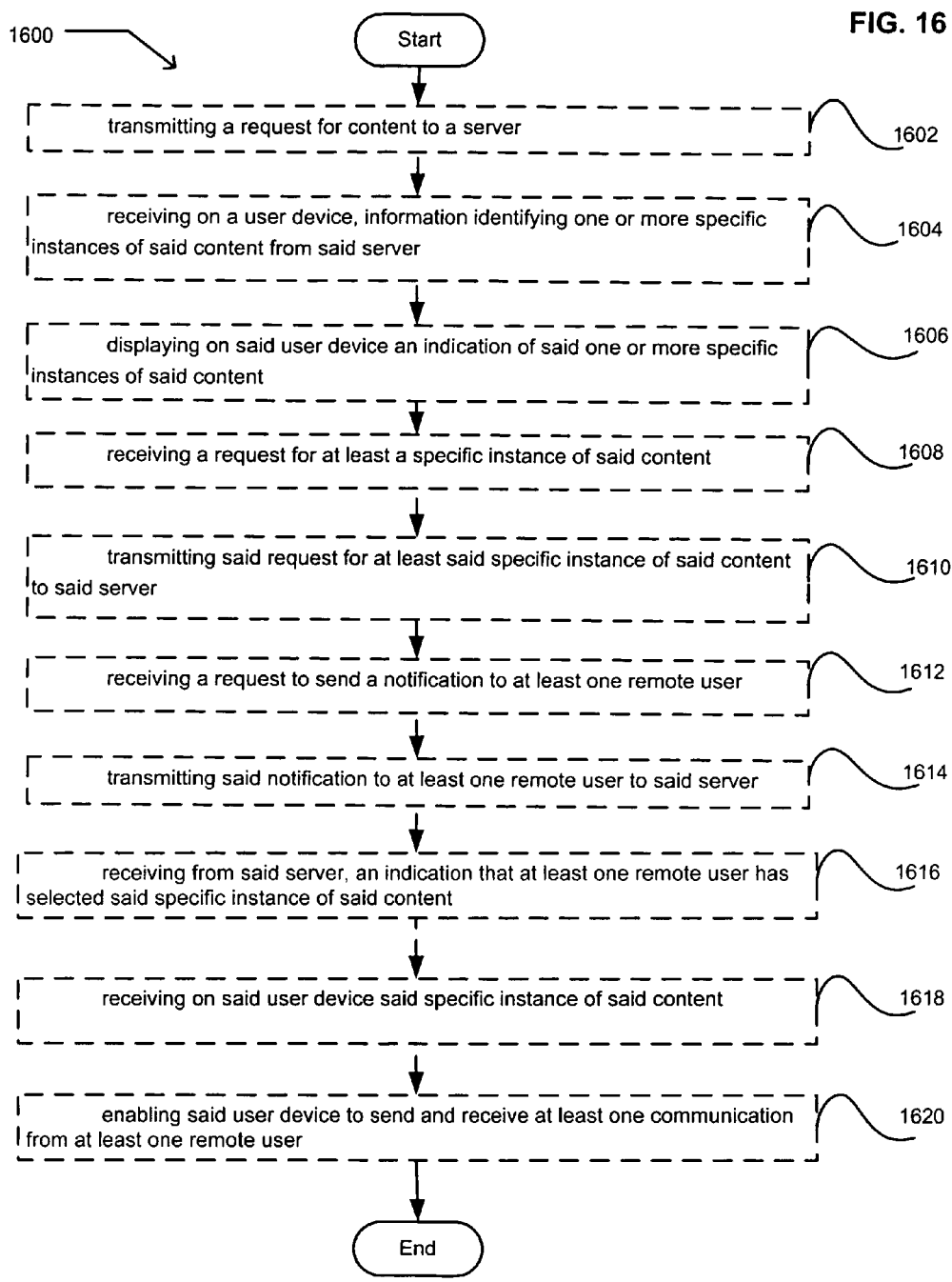
FIG. 16 illustrates an alternative illustrates an alternative embodiment of the example operations related to techniques for receiving content.

FIG. 16 illustrates the operational flow 1600 representing example operations relating to receiving content that optionally may include one or more of the operations 1600, 1602, 1604, 1606, 1608, 1610, 1612, 1614, 1618, and/or 1620.

Operation 1600 starts the operational procedure. Operation 1602 illustrates the step of transmitting a request for content to a server. For example network circuit 104 of user device 102 transmitting a request to view the movies available for viewing. More specifically, antenna 104 of cellular phone 102 transmitting a packet indicative of a request to a streaming movie provider 150 to view a list of movies in a database 160 that are available for streaming.

Operation 1604 shows receiving on a user device, information identifying one or more specific instances of said content from said server. An example of this operational step may include a user device 102 receiving information about the available movies from a server 150. A specific example of this may be a cellular phone 102 receiving a packet indicative of a list of the available documentary films that may be streamed.

Operation 1606 illustrates displaying on said user device an indication of said one or more specific instances of said content. For example and in addition to the preceding example, user device 102 displaying the information received in operational 1604 on a display 106. A more specific example of this may be cellular phone 102 displaying the contents of a packet received in operation 1604 on an LCD screen 106 where the packet comprises a list of documentary films that are available to be streamed.

Operational step 1608 illustrates receiving a request for at least a specific instance of said content. For example and in addition to the preceding example user device 102 receiving a request for a specific movie from a user input module 108. A more specific example may be cellular phone 102 receiving a user input from a user input module 108 (e.g., voice command, and/or touch command) selecting a specific documentary film for streaming.

Operational step 1610 illustrates transmitting said request for at least said specific instance of said content to said server. For example and in addition to the preceding example user device 102 transmitting a request to view a specific movie to a server 150. More specifically, cellular phone 102 transmitting a packet indicative of a request to stream the specific documentary film selected in the preceding operational step 1608.

Operational step 1612 illustrates receiving a request to send a notification to at least one remote user. For example and in addition to the previous example user device 102 receiving a request from a user input module 108 to send a notification to at least one remote user 1041 through 104N. More specifically, cellular phone 102 receiving a command through a user input module 108 (e.g., voice command and/or touch command) indicative of a request to send a message to at least one buddy 1041 . . . 104N.

Operational step 1614 shows transmitting said notification to at least one remote user to said server. For example and in addition to the previous example user device 102 transmitting over a network circuit 104 the notification received from a user 1040 in the preceding step 1612 for at least one remote user 1041 . . . 104N to a server 150. A more specific example may be a cellular phone 102 transmitting a packet over a network circuit 104 to a streaming movie provider 150. The packet may be indicative of a message for at least one buddy 1041 . . . 104N notifying them that the user 1040 selected a documentary film to stream.

Operational step 1616 shows receiving from said server an indication that at least one remote user has selected said specific instance of said content. For example and in addition to the preceding example user device 102 receiving over a network circuit 104 a transmission from a server 150 indicating that at least one remote user 1041 . . . 104N has selected the specified movie for viewing. More specifically, cellular phone 102 receiving over an antenna 104 from a streaming movie provider 150 a packet indicating that at least one buddy 1041 . . . 104N has elected to view the specified documentary film.

Operational step 1618 shows receiving on said user device said specific instance of said content. For example and in addition to the preceding example user device 102 receiving over a network circuit 104 from a server 150 the specified documentary film. More specifically, a cellular phone 102 receiving over an antenna 104 from a streaming media provider a streamed documentary film.

Operational step 1620 shows enabling said user device to send and receive at least one communication from at least one remote user. For example and in addition to the preceding example communication circuitry 112 configuring user device 102 to send and/or receive at least one communication over a network circuit 104 from a remote user 1041 . . . 104N. More specifically, communication circuitry 112 configuring cellular phone 102 to send at least one communication (e.g., text, cellular, video, and/or push to talk message) over an antenna 104 to a buddy 1041 . . . 104N. Another example may include communication circuitry configuring cellular phone 102 to receive a communication over an antenna 104 from a buddy 1041 . . . 104N.

FIG. 17 through FIG. 22 provide additional embodiments of the operation 1600. One skilled in the art will recognize that the operational steps illustrated in FIG. 17 through FIG. 22 are only examples and that other combinations are possible.

Figure 17:
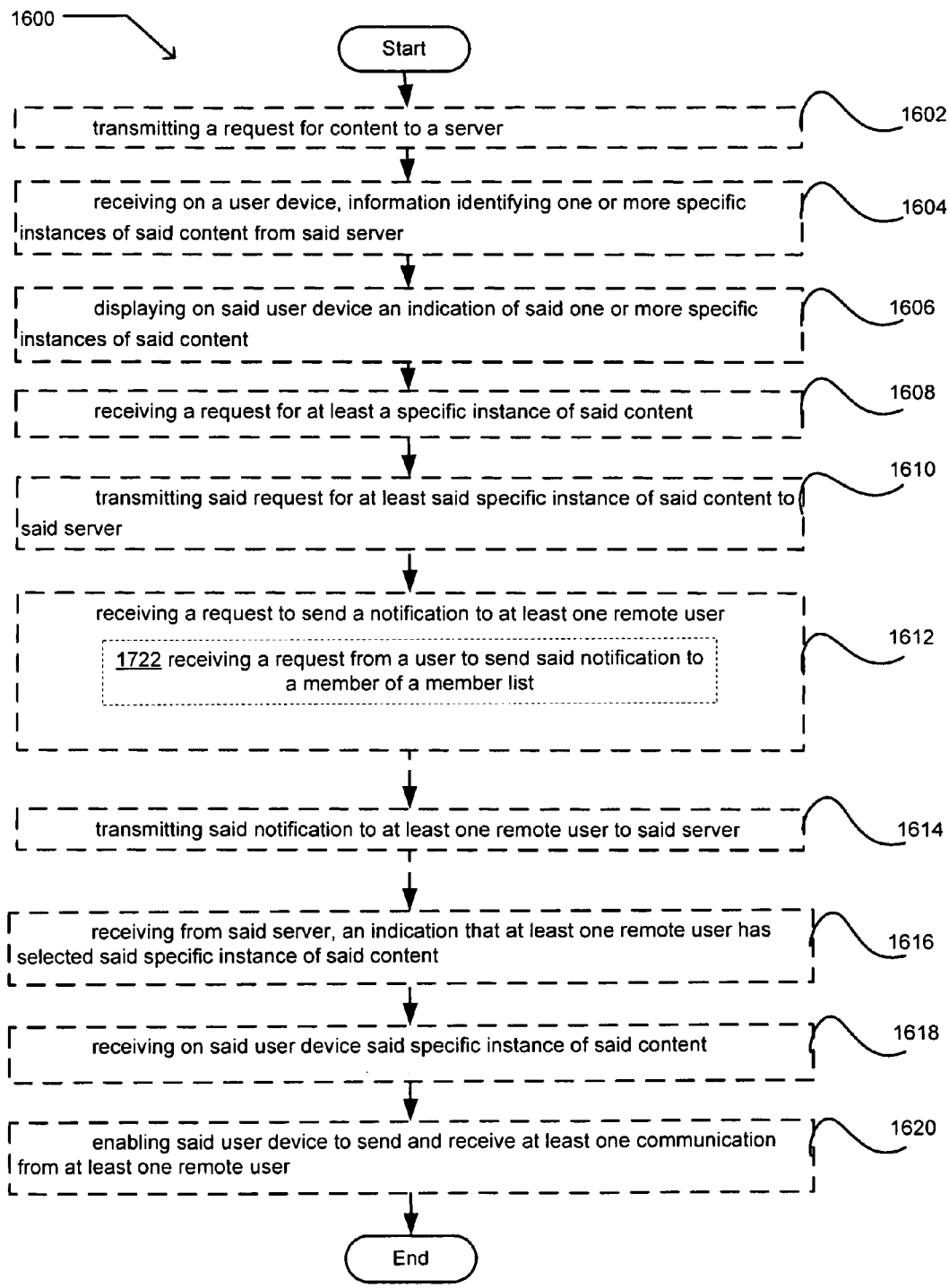
FIG. 17 illustrates an alternative embodiment of the example operational flow of FIG. 16.

FIG. 17 illustrates alternative embodiments of the example operational flow 1600 of FIG. 16. FIG. 17 illustrates the operational step 1612 of receiving a request to send a notification to at least one remote user including operation 1722.

Optional operational step 1722 shows receiving a request from a user to send said notification to a member of a member list. For example, device 102 receiving a request from a user 1040 through a user input module 108 to send a notification to a member of a member list 110. More specifically, cellular phone 102 receiving an input from a touchpad 108 indicative of a request to send a message to a buddy 1041 . . . 104N that is listed in a buddy list 110.

Figure 18:
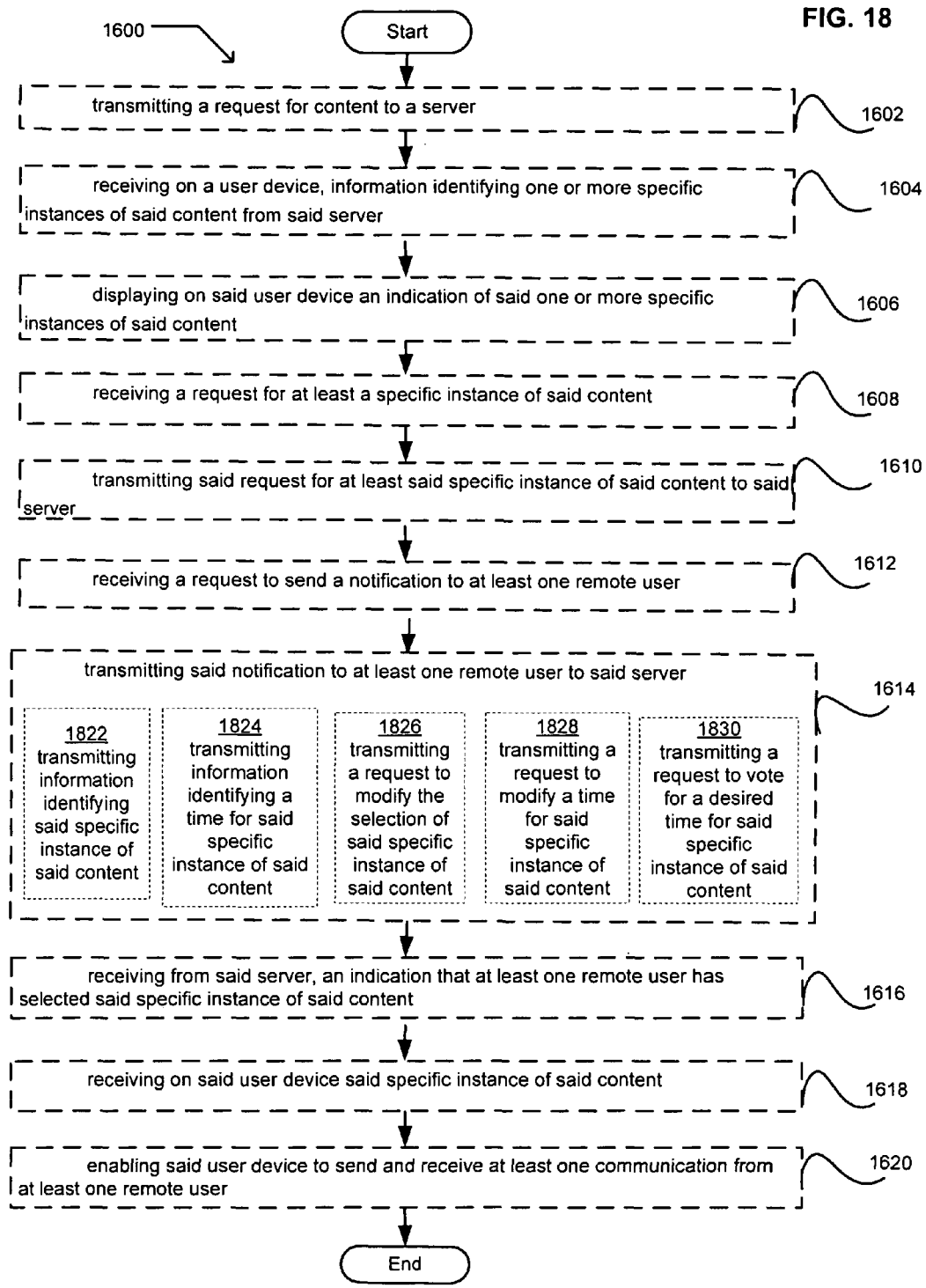
FIG. 18 illustrates an alternative embodiment of the example operational flow of FIG. 16.

FIG. 18 illustrates alternative embodiments of the operational flow 1600 of FIG. 16. FIG. 18 shows example embodiments where the operation 1614 of transmitting said notification to at least one remote user to said server including the operations 1822, 1824, 1826, 1828 and/or 1830.

Operation 1822 shows transmitting information identifying said specific instance of said content. For example user device 102 transmitting over a network circuit 104 information identifying the movie selected by user 1040. More specifically, cellular phone 102 transmitting over an antenna 104 a packet containing information identifying the documentary film selected by user 1040.

Operation 1824 shows transmitting information identifying a time for said specific instance of said content. For example user device 102 transmitting over a network circuit 104 information identifying a time selected by user 1040 for viewing a movie. More specifically, cellular phone 102 transmitting over an antenna 104 a packet containing information identifying a time selected by a user 1040 for having streaming media provider 150 stream a documentary film.

Operation 1826 shows transmitting a request to modify the selection of said specific instance of said content. For example, user device 102 transmitting over a network circuit 104 a request to change the movie selected by a user 1040 to a server 150. More specifically, cellular phone 102 transmitting over an antenna 104 a packet indicative of a request to change the documentary film selected by a user 1040 to a streaming media provider 150.

Operation 1828 illustrating transmitting a request to modify a time for said specific instance of said content. For example, user device 102 transmitting over a network circuit 104 a request to change the time for server 150 to transmit the movie selected by a user 1040. More specifically, cellular phone 102 transmitting over an antenna 104 a packet indicative of a request to change the time for the streaming media provider 150 to stream a documentary film selected by a user 1040.

Operation 1830 illustrates transmitting a request to vote for a desired time for said specific instance of said content. For example user device 102 transmitting over a network circuit 104 a request for one or more remote users 1041 through 104N to vote for a time for server 150 to transmit a specific movie. More specifically, cellular phone 102 transmitting over an antenna 104 a packet indicative of a request for one or more buddies 1041 . . . 104N to choose for a time for streaming movie provider 150 to stream a documentary film.

Figure 19:
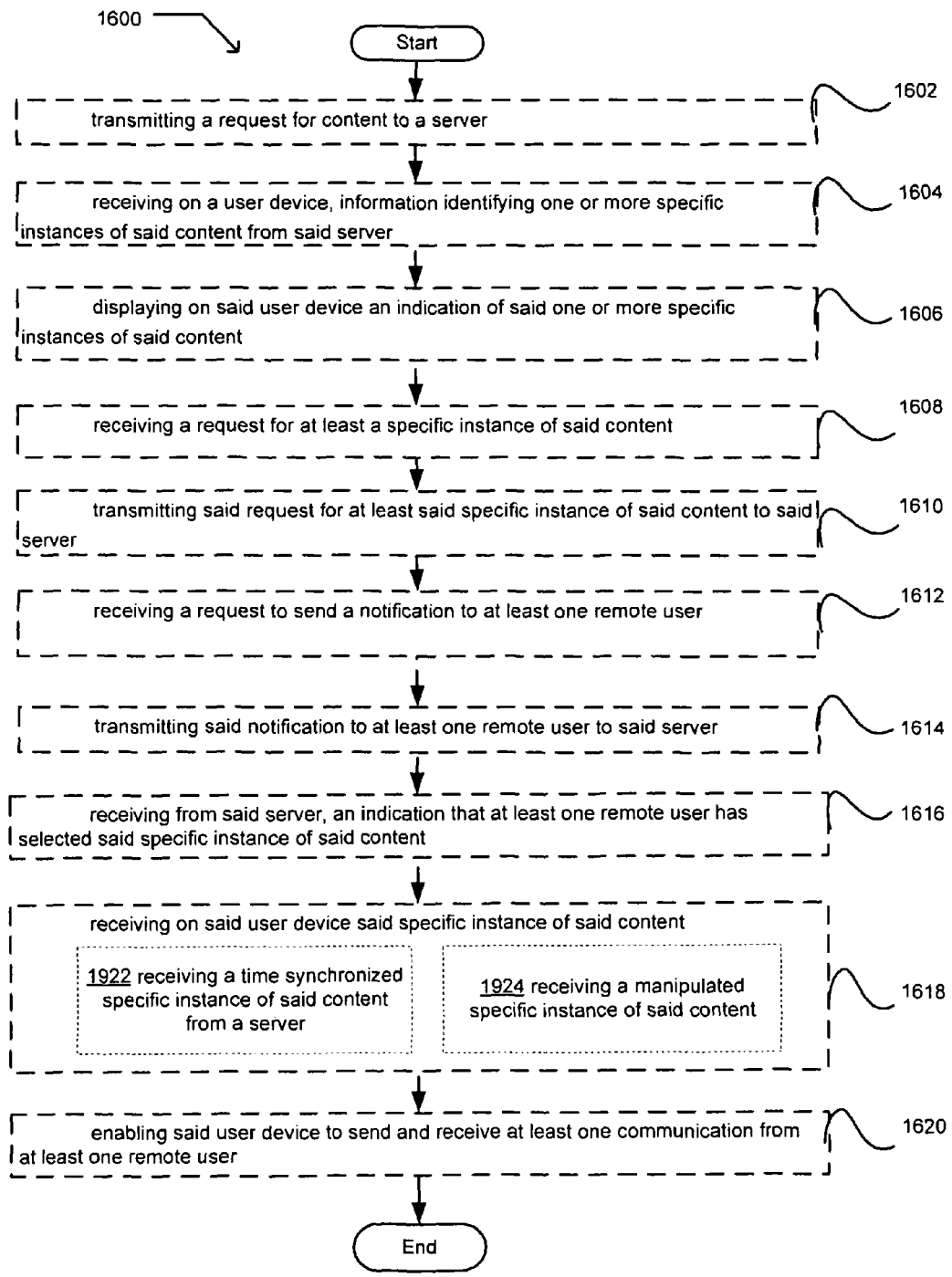
FIG. 19 illustrates an alternative embodiment of the example operational flow of FIG. 16.

FIG. 19 illustrates alternative embodiments of the operational flow 1600 of FIG. 16. FIG. 19 shows the operational step 1618 of receiving on said user device said specific instance of said content including operations 1922, and/or 1924.

Operational step 1922 illustrates receiving a time synchronized specific instance of said content from a server. For example, user device 102 receiving over a network circuit 104 a synchronized specific movie from a server 150. More specifically, cellular phone 102 receiving over an antenna 104 a streamed documentary film from a server 150 where the streamed documentary film is in-time with a documentary film streamed to at least one buddy 1041 . . . 104N.

Operational step 1924 illustrates receiving a manipulated specific instance of said content For example, user device 102 receiving over a network circuit 104 a manipulated specific instance of a movie. More specifically, cellular phone 102 receiving over an antenna 104 a manipulated (e.g., paused, stopped, played, fast forwarded and/or rewound) documentary film.

Figure 20:
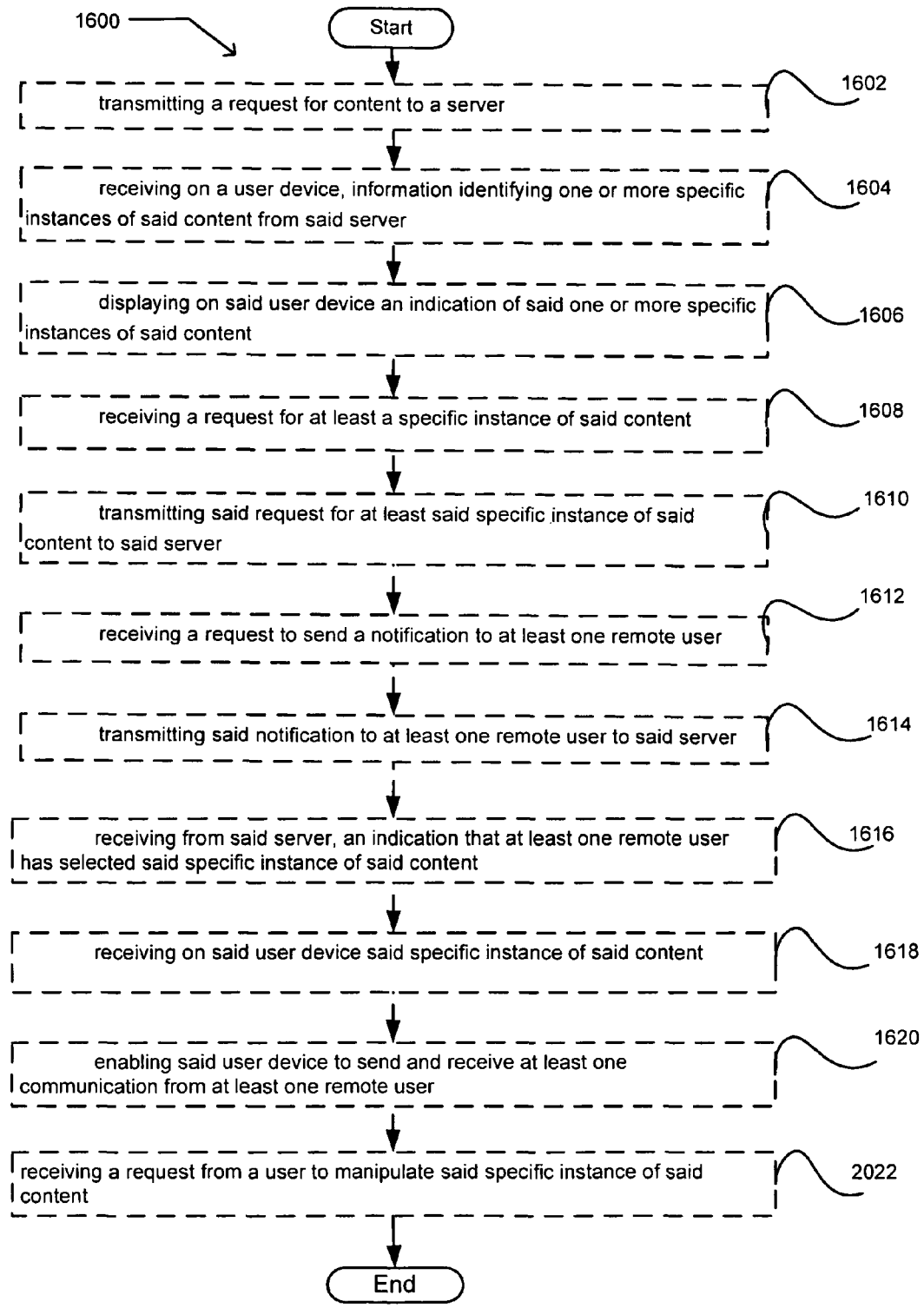
FIG. 20 illustrates an alternative embodiment of the example operational flow of FIG. 16.

FIG. 20 illustrates alternative embodiments of the operational flow 1600 of FIG. 16. FIG. 20 illustrates the operational flow of 1600 having an operation 2022.

Operation 2022 shows receiving a request from a user to manipulate said specific instance of said content 2022. For example user device 102 receiving through a user input module 108 a command indicative of a request from a user 1040 to manipulate the movie being viewed. More specifically, cellular phone 102 receiving through a touchpad 108 a command indicative of a request from a user 1040 to manipulate (e.g., pause, stop, play, fast forward, and/or rewind) the streaming documentary film.

Figure 21:
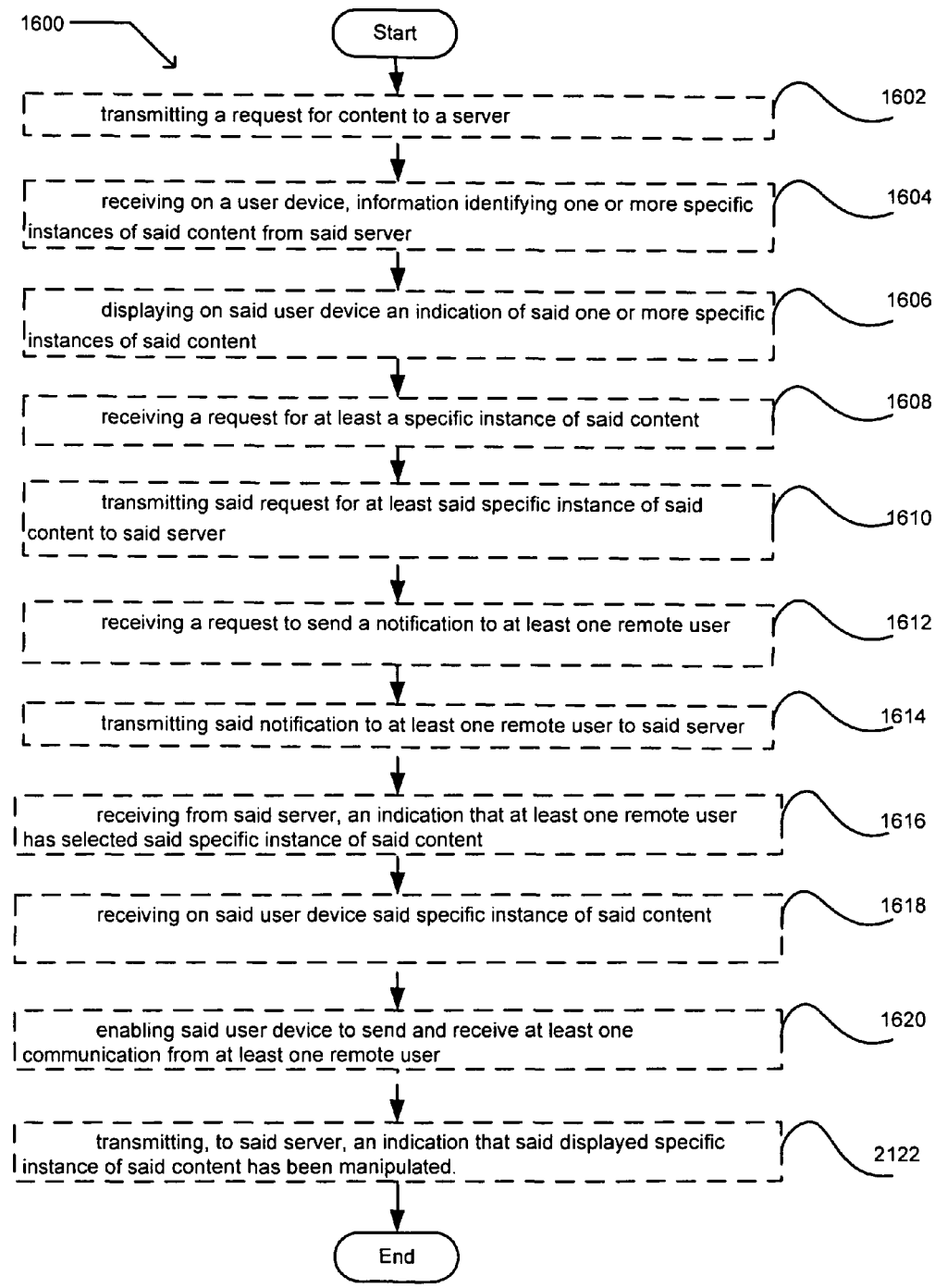
FIG. 21 illustrates an alternative embodiment of the example operational flow of FIG. 16.

FIG. 21 illustrates alternative embodiments of the operational flow 1600 of FIG. 16. FIG. 21 illustrates the operational flow of 1600 including operation 2122.

Operation 2122 shows transmitting, to said server an indication that said displayed specific instance of said content has been manipulated. For example user device 102 transmitting over a network connection 104 an indication that user 1040 manipulated the movie viewed to a server 150. More specifically, cellular phone 102 transmitting over an antenna 104 a packet indicating that user 1040 manipulated (e.g., pause, stop, play, fast forward, and/or rewind) the streaming documentary film to a streaming movie provider 150.

Figure 22:
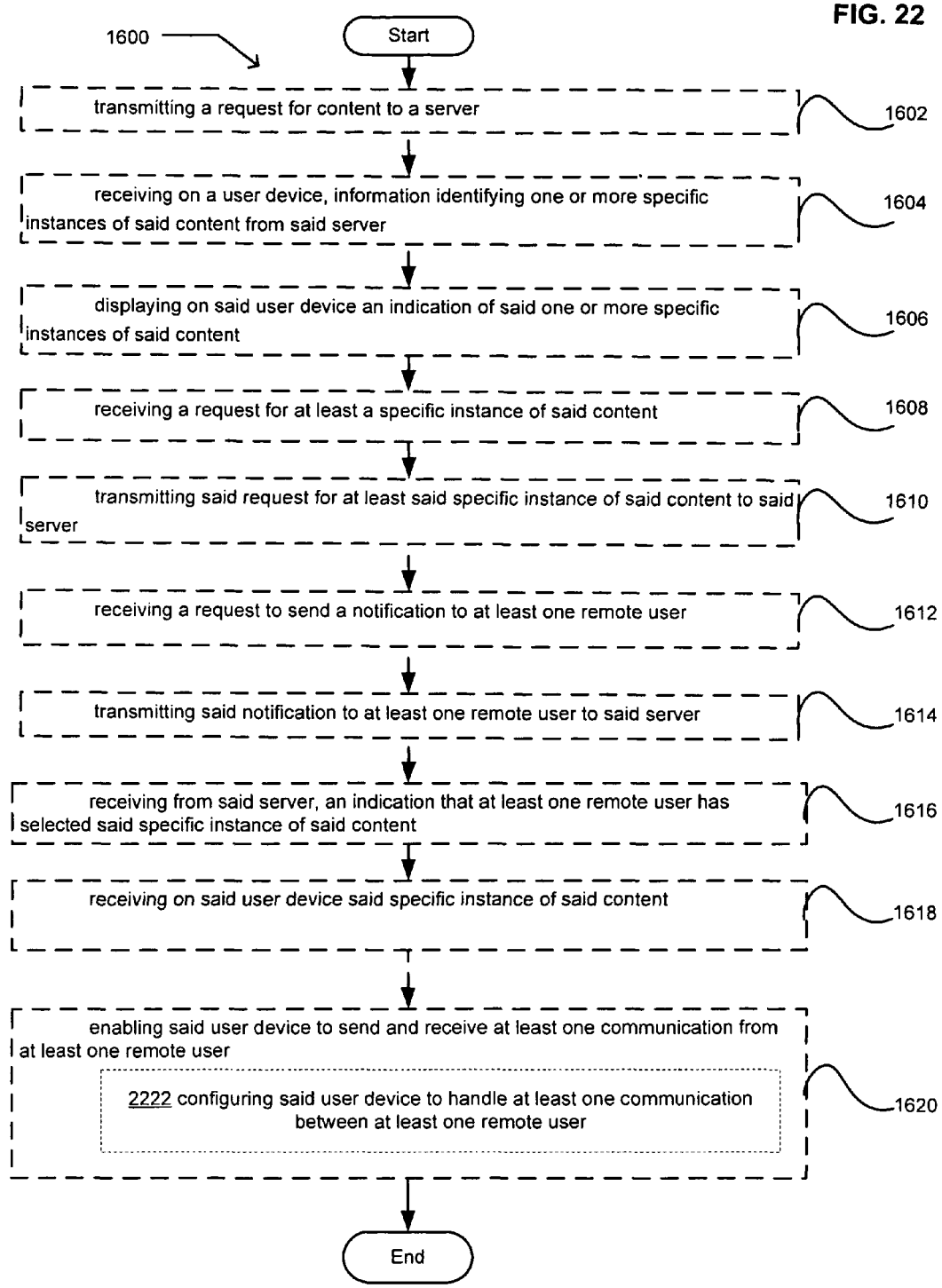
FIG. 22 illustrates an alternative embodiment of the example operational flow of FIG. 16.

FIG. 22 illustrates an alternative embodiment of the operational flow 1600 of FIG. 16. FIG. 22 illustrates the operational step 1620 of enabling said user device to send and receive at least one communication from at least one remote user including operation 2222.

Operation 2222 includes configuring said user device to handle at least one communication between at least one remote user. For example, communication circuitry 112 configuring user device 102 to handle at least one communication between a user 1040 and at least one remote user 1041 . . . 104N. More specifically, communication circuitry 112 configuring cell phone 102 to allow the cell phone 102 to send a message from at least one buddy 1041 . . . 104N. Another example may include communication circuitry configuring 112 cell phone 102 to allow the cell phone 102 to receive a message from at least one buddy 1041 . . . 104N.

Figure 23:
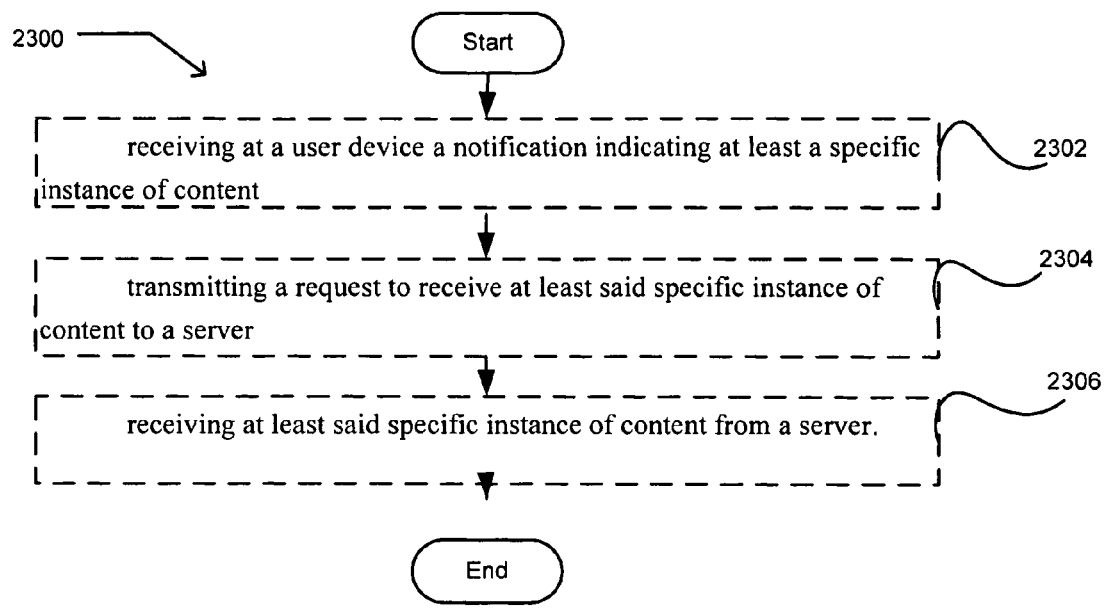
FIG. 23 illustrates an alternative embodiment of the example operations related to techniques for receiving content.

FIG. 23 illustrates the operational flow 2300 representing example operations relating to receiving content that may optionally include one or more of the operations 2302, 2304, and/or 2306.

Operation 2300 starts the operational procedure. Operation 2302 illustrates the step of receiving, at a user device a notification indicating at least a specific instance of content. For example, network circuit 104 of user device 102 receiving a notification indicating that a specific instance of content is available for reception. More specifically, network circuit (e.g., antenna, Ethernet port, cable TV head-in) 104 of user device (e.g., mobile phone, TV, PDA, and/or laptop computer) 102 receiving a signal (e.g., packet based, cellular, analog, and/or digital cable signal) indicative of a message indicating that a specific instance of a documentary film is available (e.g., is streaming, and/or is going to be streamed at a certain time) for viewing. Another example may include, network circuit 104 receiving a notification by way of a signal (e.g., Bluetooth signal, RF signal, proximity detector, and/or Wi-Fi) from a remote user's device 1041 . . . 104N indicating a specific documentary film for joint viewing.

Operational step 2304 illustrates transmitting a request to receive at least said specific instance of content to a server. For example, and in addition to the preceding example, user device 102 transmitting over a network circuit 104 a request to view a specific movie to a server 150. More specifically, network circuit (e.g., antenna, Ethernet port, cable TV head-in) 104 of user device (e.g., mobile phone, TV, PDA, and/or laptop computer) 102 transmitting a request (e.g., packet, analog, and/or digital signal) to a streaming movie provider 150 to receive the documentary film specified in operational step 2302.

Operational step 2306 illustrates receiving at least said specific instance of content from said server. For example and in addition to the preceding example, user device 102 receiving over a network circuit 104 from a server 150 the specified documentary film. More specifically, a cellular phone 102 receiving over an antenna 104 from a streaming media provider 150 a streamed documentary film.

Figure 24:
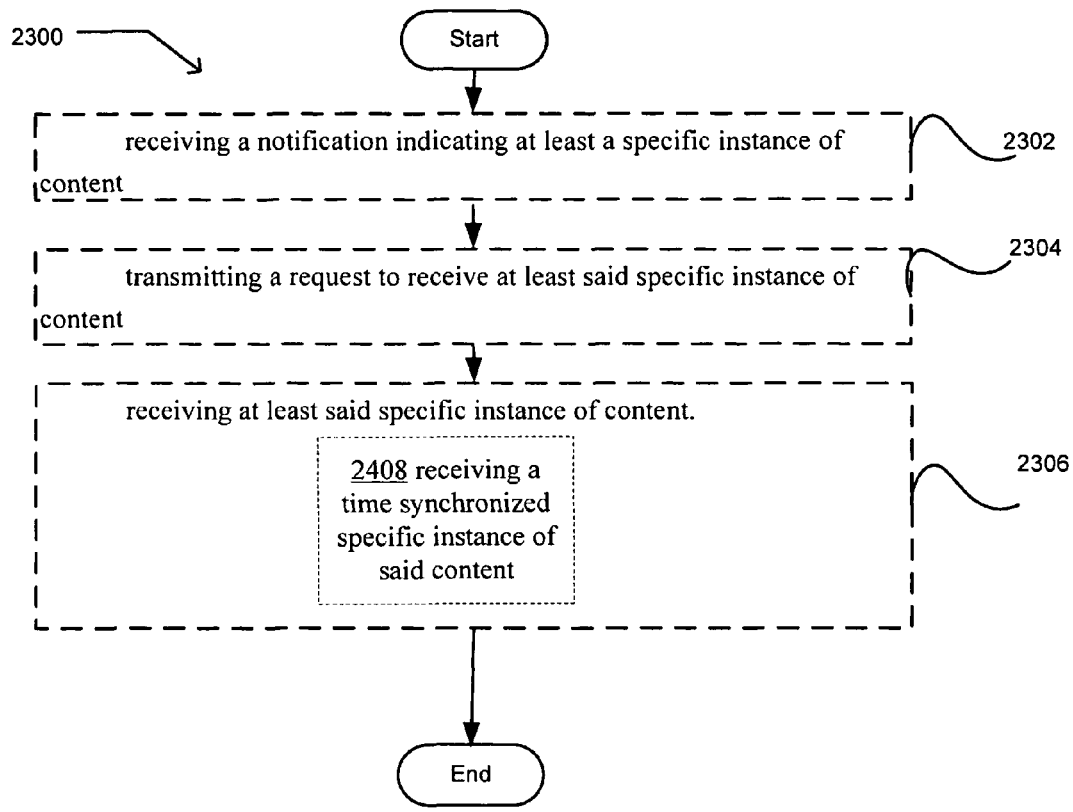
FIG. 24 illustrates an alternative embodiment of the example operational flow of FIG. 23.
Figure 25:
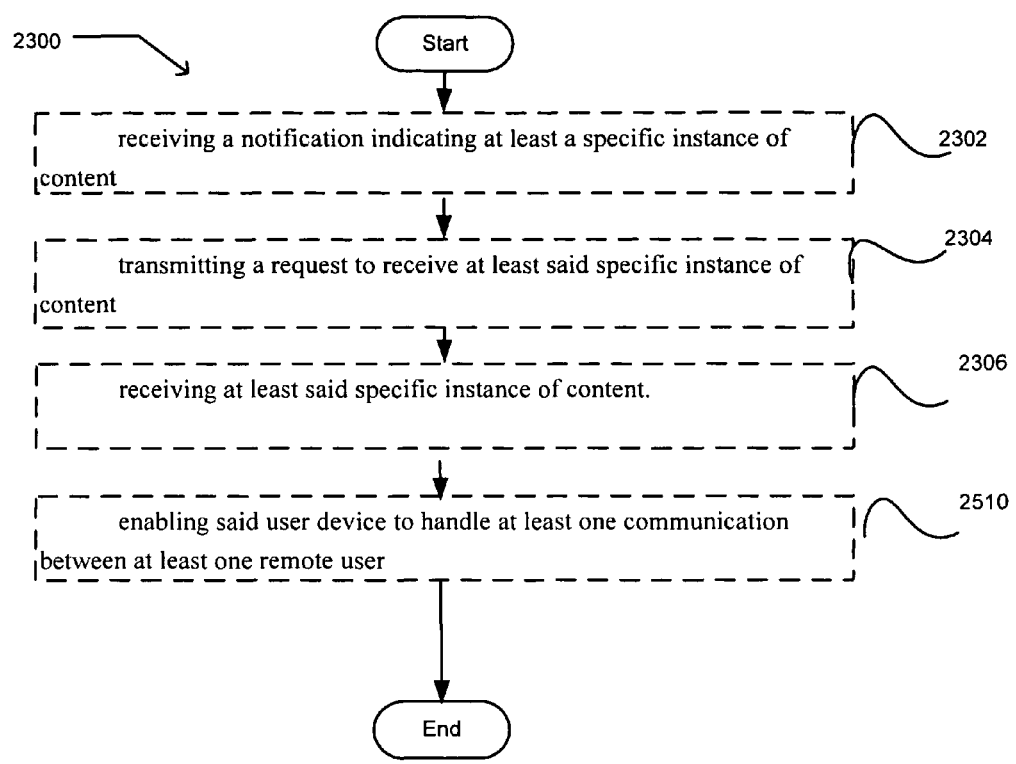
FIG. 25 illustrates an alternative embodiment of the example operational flow of FIG. 23.

FIGS. 24 and 25 illustrate alternative embodiments of the operational flow 2300. FIG. 24 illustrates an alternative embodiment where the operational step 2306 receiving at least said specific instance of content from said server may include the optional operation 2408.

Operational step 2408 shows receiving a time synchronized specific instance of said content from said server. For example, user device 102 receiving over a network circuit 104 a synchronized specific movie from a server 150. More specifically, cellular phone 102 receiving over an antenna 104 a streamed documentary film from a server 150 where the streamed documentary film is in-time with a documentary film streamed to at least one remote user 1041 ... 104N (e.g., a buddy, and/or any user that elected to receive the documentary film).

FIG. 25 illustrates an alternative embodiment of the example operational flow 2300 of FIG. 23. FIG. 25 illustrates an example embodiment where the operational flow 2300 may optionally include operation 2510.

Operational step 2510 shows enabling said user device to handle at least one communication between at least one remote user. For example, communication circuitry 112 configuring user device 102 to send and/or receive at least one communication over a network circuit 104 from a remote user 1041 through 104N. More specifically, communication circuitry 112 configuring cellular phone 102 to send at least one communication (e.g., text, cellular, and/or push to talk message) over an antenna 104 to a buddy 1041 ... 104N. Another example may include communication circuitry 112 configuring cellular phone 102 to receive a communication (e.g., text, cellular, and/or push to talk message) over an antenna 104 from a buddy 1041 ... 104N.

Figure 26:
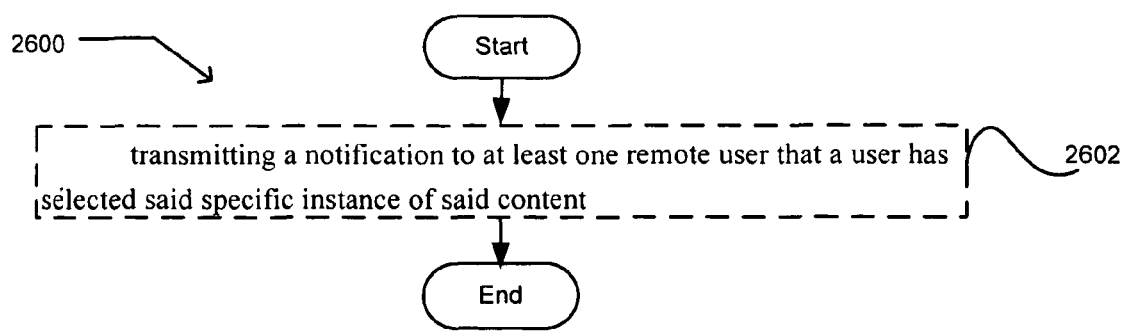
FIG. 26 illustrates an alternative embodiment of the example operations related to techniques for receiving content.

FIG. 26 illustrates the operational flow 2600 representing an example operation for receiving content including the operation 2602.

Operation 2600 starts the operational procedure. Operation 2602 illustrates transmitting a notification to at least one remote user that a user has selected a specific instance of said content. For example, media management logic 120 transmitting to one or more of remote user 1041 ... 104N a message indicating that user 1040 has selected a specified movie for viewing. A more specific example might include media management logic 120 transmitting to one or more buddies 1041 ... 104N a message (e.g., text, video and/or voice message) indicating that a documentary film has been selected for viewing by a user 1040.

Figure 27:
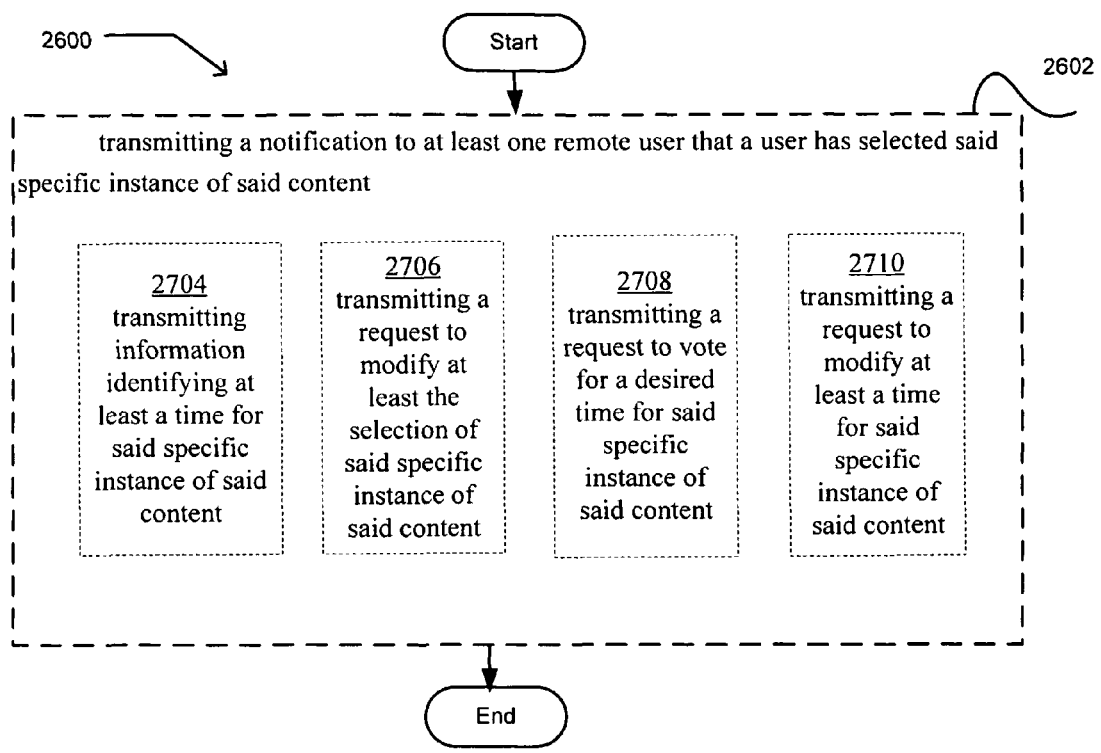
FIG. 27 illustrates an alternative embodiment of the example operational flow of FIG. 26.

FIG. 27 shows an alternative embodiment of the operational flow 2600 of FIG. 26. FIG. 27 depicts the operational step 2602 of transmitting a notification to at least one remote user that a user has selected a specific instance of said content optionally including steps 2704, 2706, 2708, and/or 2710.

Operational step 2704 shows transmitting information identifying at least a time for said specific instance of said content. For example, media management logic 120 transmitting to one or more buddies 1041 ... 104N a message generated by notification logic 180 where the generated message identifies a time for viewing a specific movie. More specifically, media management logic 120 transmitting a packet to at least one buddy 1041 ... 104N, where the packet is indicative of a message identifying a time for receiving a streamed documentary film.

Operational step 2706 shows transmitting a request to modify at least the selection of said specific instance of said content. For example, media management logic 120 transmitting a request to modify the selection of the movie to at least one remote user 1041 ... 104N. A specific example of this may include media management logic 120 transmitting a packet to at least one buddy 1041 ... 104N where the packet is indicative of a request for at least one buddy 1041 ... 104N to pick a different documentary film to stream.

Operational step 2708 shows transmitting a request to vote for a desired time for said specific instance of said content. For example, media management logic 120 transmitting a request for one or more remote members 1041 ... 104N to vote for a time to transmit a specific movie. More specifically, media management logic 120 transmitting a packet indicative of a request for one or more buddies 1041 ... 104N to choose a time from a list of possible times for the server 150 to stream the desired documentary film.

Operational step 2710 transmitting a request to modify at least a time for said specific instance of said content. For example, media management logic 120 transmitting a request to modify the selection of the time for server 150 to transmit a movie to at least one remote user 1041 ... 104N. More specifically, media management logic 120 transmitting a packet to at least one buddy 1041 ... 104N where the packet is indicative of a request for at least one buddy 1041 ... 104N to choose a different time for the server 150 to stream a documentary film to a user 1040 and one or more buddies 1041 ... 104N.

Figure 28:
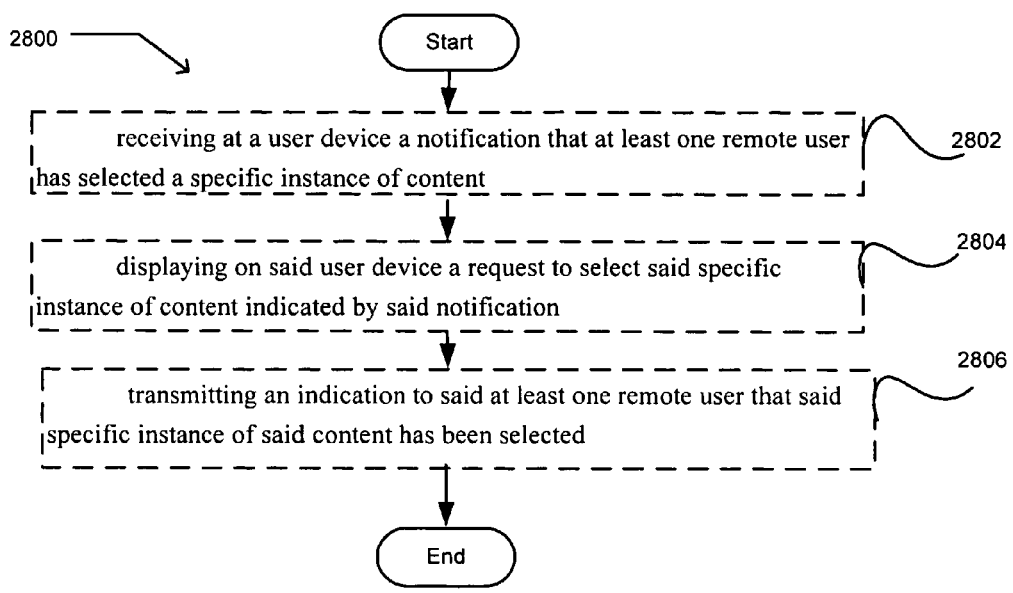
FIG. 28 illustrates an alternative embodiment of the example operations related to techniques for receiving content.

FIG. 28 illustrates the operational flow 2800 representing example operations relating to receiving content that may optionally include operations 2802, 2804, and/or 2806.

Operation 2800 starts the operational procedure. Operation 2802 illustrates receiving at a user device a notification that at least one remote user has selected a specific instance of content. For example, user device 102 receiving a notification indicating that at least one remote user 1041 ... 104N selected a specific instance of content for viewing. More specifically, user device 102 (e.g., cellular phone, TV, laptop computer, PDA) receiving a signal (e.g., packet based, cellular, and/or analog or digital cable) indicative of a message indicating that at least one buddy 1041 ... 104N has selected a specific documentary film for a server 150 to stream.

Operation 2804 illustrates displaying on said user device a request to select said specific instance of content indicated by said notification. For example and in addition to the previous example, user device 102 displaying a request to select the specific movie for viewing on a screen 106. More specifically, cellular phone 102 displaying a request to view a specified documentary film on a LCD screen 106.

Operation 2806 illustrates transmitting an indication to said at least one remote user that said specific instance of said content has been selected. For example and in addition to the preceding example user device 102 transmitting a signal from a network circuit 104 of a user device 102 indicating that a user 1040 has selected a specified movie to at least one remote user 1041 ... 104N. More specifically, a cellular phone 102 transmitting over an antenna 104 a packet indicative of the user's selection of the specified documentary film to at least one buddy 1041 ... 104N.

Figure 29:
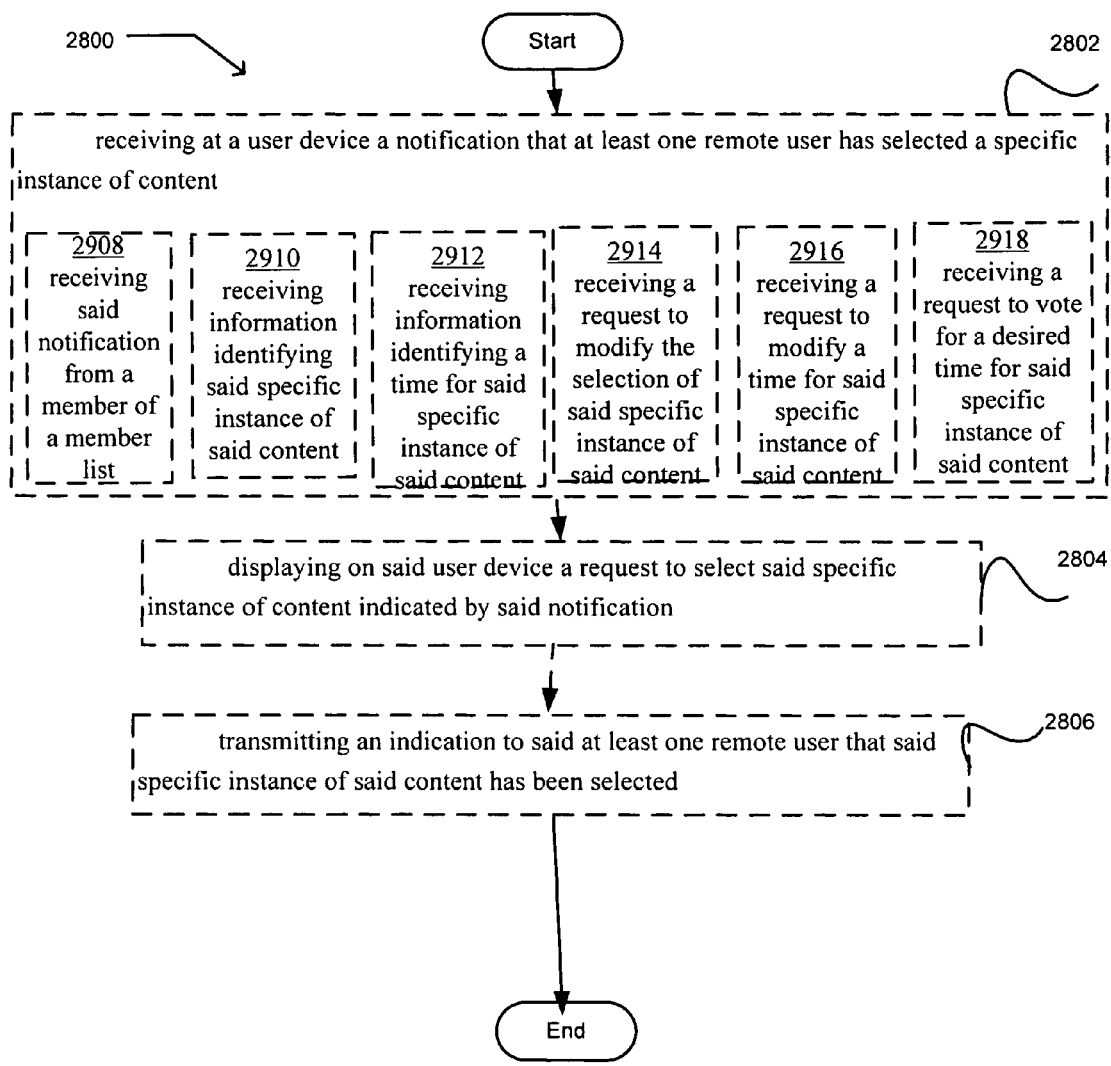
FIG. 29 illustrates an alternative embodiment of the example operational flow of FIG. 28.

FIG. 29 shows an alternative embodiment of the operational flow 2800 of FIG. 28. FIG. 29 depicts the operational step 2802 receiving at a user device a notification that at least one remote user has selected a specific instance of content optionally including steps 2908, 2910, 2912, 2914, 2916, and/or 2918.

Operational step 2908 shows receiving said notification from a member of a member list. For example network circuit 104 receiving a notification from a member of a member list 110. More specifically, antenna 104 of cellular phone 102 receiving a packet indicative of a message from at least one buddy 1041 ... 104N whose information is contained in a buddy list 110.

Operational step 2910 shows receiving information identifying said specific instance of said content. For example, network 104 receiving a notification containing information identifying a specific movie. More specifically, antenna 104 of cellular phone 102 receiving a packet indicative of a notification where the notification contains information identifying a documentary film.

Operational step 2912 shows receiving information identifying a time for said specific instance of said content. For example, network circuit 104 receiving information identifying a specific time for viewing a specified movie. More specifically, network circuit 104 of cellular device 102 receiving a packet indicative of a notification. The notification may contain information identifying a specific time for a server 150 to stream a documentary film to a user 1040.

Operational step 2914 shows receiving a request to modify the selection of said specific instance of said content. For example network circuit 104 may receive a request to modify the current selection of a movie. More specifically, cellular phone 102 with antenna 104 receiving a packet indicative of a request to change the documentary film to be streamed.

Operational step 2916 shows receiving a request to modify a time for said specific instance of said content. For example network circuit 104 may receive a request to modify the time for server 150 to stream the selected movie. More specifically, cellular phone 102 with antenna 104 receiving a packet indicative of a request to change the time for the streaming movie service provider 150 to stream the selected documentary film.

Operational step 2918 shows receiving a request to vote for a desired time for said specific instance of said content. For example, user device 102 with network circuit 104 receiving a request for a user 1040 to vote on one or more optional times for the server 150 to transmit the selected movie. More specifically, cellular phone 102 with network circuit 104 receiving a request for a user 1040 to select a time from a list of choices for server 150 to stream the selected documentary film.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B".

What is claimed is:

1. A system for providing content comprising:
    circuitry on a server for receiving a request for at least a specific instance of content from a user;
    circuitry on the server for receiving a request to notify at least one remote user that said specific instance of said content has been selected by said user;
    circuitry on the server for transmitting a request to vote for a desired time for said specific instance of said content;
    circuitry on the server for transmitting to said user information indicating the status of said at least one remote user;
    circuitry on the server for transmitting a notification to said at least one remote user that said user has selected said specific instance of said content;
    circuitry on the server for receiving an indication that said at least one remote user selected said specific instance of said content;
    circuitry on the server for transmitting said indication that said at least one remote user selected said specific instance of said content to said user;
    circuitry on the server for transmitting said specific instance of said content to said user and said at least one remote user; and
    circuitry on the server for enabling interaction between said user and said at least one remote user.

2. The system of claim 1 comprising: circuitry on the server for receiving a request from said user to access a member list, wherein said member list contains said at least one remote user.

3. The system of claim 1, wherein said receiving a request to notify at least one remote user that said specific instance of said content has been selected by said user comprises:
    circuitry on the server for receiving a request to notify at least one member of a member list that said specific instance of said content has been selected by said user.

4. The system of claim 1, wherein said circuitry on the server for transmitting a notification to said at least one remote user that said user has selected said specific instance of said content comprises:
    circuitry on the server for transmitting information identifying at least a time for said specific instance of said content.

5. The system of claim 1, wherein said circuitry on the server for transmitting a notification to said at least one remote user that said user has selected said specific instance of said content comprises:
    circuitry on the server for transmitting a request to modify at least the selection of said specific instance of said content.

6. The system of claim 1, wherein said circuitry on the server for transmitting a notification to said at least one remote user that said user has selected said specific instance of said content comprises:
    circuitry on the server for transmitting a request to modify at least a time for said specific instance of said content.

7. The system of claim 1, wherein said circuitry on the server for receiving an indication that said at least one remote user selected said specific instance of said content comprises:
 circuitry on the server for receiving information identifying whether said at least one remote user modified a time for said specific instance of said content.

8. The system of claim 1 wherein said circuitry on the server for receiving an indication that said at least one remote user selected said specific instance of said content comprises:
 circuitry on the server for receiving information identifying whether said at least one remote user modified said specific instance of said content.

9. The system of claim 1, wherein said circuitry on the server for receiving an indication that said at least one remote user selected said specific instance of said content comprises:
 circuitry on the server for receiving information identifying whether said at least one remote user has voted for a desired time.

10. The system of claim 1, wherein said circuitry on the server for transmitting said specific instance of said content to said user and said at least one remote user comprises:
 circuitry on the server for transmitting a time synchronized specific instance of said content to said user and said at least one remote user.

11. The system of claim 1, wherein said circuitry on the server for enabling interaction between said users and said at least one remote user comprises:
 circuitry on the server for enabling at least said user and/or said at least one remote user to manipulate said specific instance of said content.

12. The system of claim 1, wherein said circuitry on the server for enabling interaction between said user and said at least one remote user comprises:
 circuitry on the server for enabling said user and said at least one remote user to communicate with each other.

13. The system of claim 1, wherein said circuitry on the server for enabling interaction between said user and said at least one remote user comprises:
 circuitry on the server for enabling said user and said at least one remote user to communicate with each other during transmission of said specific instance of said content.

* * * * *